(12) United States Patent
Yamazaki et al.

(10) Patent No.: US 12,261,299 B2
(45) Date of Patent: Mar. 25, 2025

(54) ELECTRODE AND ELECTROCHEMICAL DEVICE

(71) Applicant: DAIKIN INDUSTRIES, LTD., Osaka (JP)

(72) Inventors: Shigeaki Yamazaki, Osaka (JP); Yoshiaki Honda, Osaka (JP); Toshiharu Shimooka, Osaka (JP); Yoshimi Motonari, Osaka (JP); Hisashi Mitsuhashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1175 days.

(21) Appl. No.: 17/091,867

(22) Filed: Nov. 6, 2020

(65) Prior Publication Data

US 2021/0057750 A1 Feb. 25, 2021

Related U.S. Application Data

(63) Continuation of application No. PCT/JP2019/017022, filed on Apr. 22, 2019.

(30) Foreign Application Priority Data

May 10, 2018 (JP) .................. 2018-091594

(51) Int. Cl.
*H01M 4/62* (2006.01)
*H01M 4/36* (2006.01)
*H01M 4/02* (2006.01)

(52) U.S. Cl.
CPC ........... *H01M 4/623* (2013.01); *H01M 4/366* (2013.01); *H01M 2004/027* (2013.01); *H01M 2004/028* (2013.01)

(58) Field of Classification Search
CPC .................. H01M 4/623; H01M 4/366; H01M 2004/027; H01M 2004/028
See application file for complete search history.

(56) References Cited

U.S. PATENT DOCUMENTS

| 2009/0004568 | A1 | 1/2009 | Hirose et al. | |
| 2009/0111019 | A1* | 4/2009 | Hirose | H01M 4/133 429/223 |
| 2013/0078516 | A1* | 3/2013 | Taniguchi | H01M 4/386 429/213 |
| 2014/0014873 | A1* | 1/2014 | Yabuuchi | C01G 49/0072 252/182.1 |
| 2014/0087252 | A1* | 3/2014 | Hirakawa | H01M 4/628 429/211 |
| 2017/0222228 | A1* | 8/2017 | Imazaki | C01G 53/50 |
| 2020/0067097 | A1 | 2/2020 | Honda et al. | |

FOREIGN PATENT DOCUMENTS

| JP | 2010-044958 A | 2/2010 |
| JP | 2018-078102 A | 5/2018 |

OTHER PUBLICATIONS

KPO decision to grant a Patent (Year: 202).*
SIPO decision to grant a Patent (Year: 2023).*
International Search Report for PCT/JP2019/017022 dated Jul. 23, 2019 (PCT/ISA/210).
International Preliminary Report on Patentability with Translation of Written Opinion dated Nov. 10, 2020, in Application No. PCT/JP2019/017022.
Extended European Search Report issued Feb. 8, 2022 in counterpart European Application No. 19800395.6.

* cited by examiner

*Primary Examiner* — Alexander Usyatinsky
(74) *Attorney, Agent, or Firm* — Sughrue Mion, PLLC

(57) ABSTRACT

An electrode having a coating layer formed from a composition including a perfluoropolyether group-containing compound represented by the formula (A1), (A2), (B1), (B2), (C1), (C2), (D1), (D2), (E1) or (E2) as defined herein, wherein in the composition, compounds represented by formulae (A2), (B2), (C2), (D2) and (E2) are 0.1 mol % or more and 35 mol % or less based on the total amount of compounds represented by formulae (A1), (B1), (C1), (D1) and (E1) and compounds represented by formulae (A2), (B2), (C2), (D2) and (E2). Also disclosed is an electrochemical device including the electrode.

21 Claims, No Drawings

ELECTRODE AND ELECTROCHEMICAL DEVICE

This is a Continuation application under 37 C.F.R. § 1.53(b) of International Application No. PCT/JP2019/017022 filed Apr. 22, 2019, which claims priority from Japanese Patent Application No. 2018-091594 filed May 10, 2018. The above noted applications are incorporated herein by reference in their respective entireties.

TECHNICAL FIELD

The present disclosure relates to an electrode and an electrochemical device, and particularly, to an alkali metal ion battery such as a lithium ion secondary battery.

BACKGROUND ART

Electrochemical devices, such as an alkali metal ion battery and an electrochemical capacitor, can have characteristic features, such as small size, high capacity and lightweight, and are used in various electronic devices. Particularly, a lithium ion secondary battery is light in weight and high in capacity and energy density. Accordingly, the lithium ion secondary battery is used in a wide variety of small electronic devices, particularly, portable devices such as a smart phone, a mobile phone, a tablet terminal, a video camera and a laptop computer.

CITATION LIST

Patent Literature

Patent Literature 1: Japanese Patent Laid-Open No. 2010-44958

SUMMARY OF THE INVENTION

Problem to be Solved by the Invention

These electrochemical devices typically have a pair of electrodes and an electrolyte. In the electrochemical devices, deterioration of the electrodes may occur during use or storage, with the result that capacity drops. Likewise, functional deterioration of electrochemical devices may occur. A method for suppressing functional deterioration of electrochemical devices is disclosed in Patent Literature 1, in which a carboxylate or sulfonate of a perfluoropolyether group is added to an electrode. However, it cannot be said that the above method can sufficiently suppress functional deterioration of electrochemical devices.

In the circumstances, an object of the present disclosure is to provide an electrochemical device, the function of which is suppressed from deteriorating during use or storage.

Means to Solve the Problem

The present disclosure includes the following embodiments.

[1] An electrode having a coating layer formed from a composition comprising a perfluoropolyether group-containing compound represented by the following formula (A1), (A2), (B1), (B2), (C1), (C2), (D1), (D2), (E1) or (E2), wherein in the composition, compounds represented by formulae (A2), (B2), (C2), (D2) and (E2) are 0.1 mol % or more and 35 mol % or less based on the total amount of compounds represented by formulae (A1), (B1), (C1), (D1) and (E1) and compounds represented by formulae (A2), (B2), (C2), (D2) and (E2):

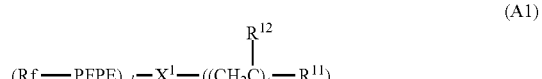
(A1)

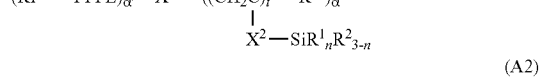
(A2)

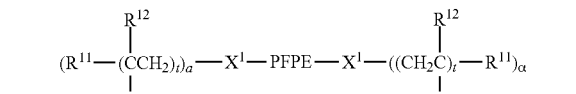
(B1)

(B2)

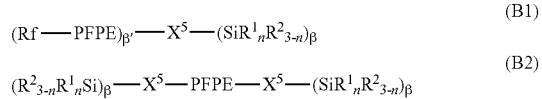

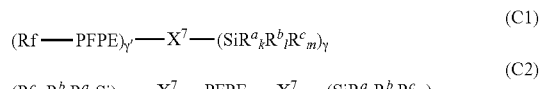
(C1)

(C2)

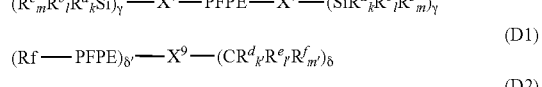
(D1)

(D2)

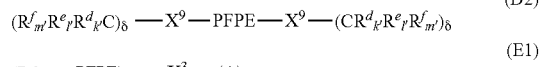

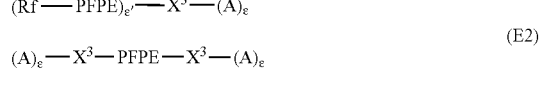
(E1)

(E2)

wherein:
Rf each independently represents an alkyl group having 1 to 16 carbon atoms optionally substituted with one or more fluorine atoms;
PFPE each independently represents $-(OC_6F_{12})_a-(OC_5F_{10})_b-(OC_4F_8)_c-(OC_3F_6)_d-(OC_2F_4)_e-(OCF_2)_f-$, wherein a, b, c, d, e and f are each independently an integer of 0 or more and 200 or less, and the sum of a, b, c, d, e and f is at least 1, the occurrence order of the respective repeating units enclosed in parentheses with subscript a, b, c, d, e or f is not limited in the formula;
$R^1$ each independently at each occurrence represents a hydrogen atom or an alkyl group having 1 to 22 carbon atoms;
$R^2$ each independently at each occurrence represents a hydroxyl group or a hydrolyzable group;
$R^{11}$ each independently at each occurrence represents a hydrogen atom or a halogen atom;
$R^{12}$ each independently at each occurrence represents a hydrogen atom or a lower alkyl group;
n is an integer of 0 to 3 independently for each $(-SiR^1_nR^2_{3-n})$ unit;
provided that, in formulae (A1), (A2), (B1) and (B2), at least one $R^2$ is present;
$X^1$ each independently represents a single bond or a di- to decavalent organic group;
$X^2$ each independently at each occurrence represents a single bond or a divalent organic group;
t each independently at each occurrence represents an integer of 1 to 10;
α is each independently an integer of 1 to 9;
α' is an integer of 1 to 9;

$X^5$ each independently represents a single bond or a di- to decavalent organic group;

β is each independently an integer of 1 to 9;

β' is an integer of 1 to 9;

$X^7$ each independently represents a single bond or a di- to decavalent organic group;

γ is each independently an integer of 1 to 9;

γ' is an integer of 1 to 9;

$R^a$ each independently at each occurrence represents $-Z-SiR^{71}_p R^{72}_q R^{73}_r$;

Z each independently at each occurrence represents an oxygen atom or a divalent organic group;

$R^{71}$ each independently at each occurrence represents $R^{a'}$;

$R^{a'}$ has the same definition as $R^a$;

in $R^a$, the number of Si linearly connected via Z group, is at most 5;

$R^{72}$ each independently at each occurrence represents a hydroxyl group or a hydrolyzable group;

$R^{73}$ each independently at each occurrence represents a hydrogen atom or a lower alkyl group;

p is each independently at each occurrence an integer of 0 to 3;

q is each independently at each occurrence an integer of 0 to 3;

r is each independently at each occurrence an integer of 0 to 3;

provided that, the sum of p, q and r is 3 for each $-Z-SiR^{71}_p R^{72}_q R^{73}_r$, and at least one $R^{72}$ is present in formulae (C1) and (C2);

$R^b$ each independently at each occurrence represents a hydroxyl group or a hydrolyzable group;

$R^c$ each independently at each occurrence represents a hydrogen atom or a lower alkyl group;

k is each independently at each occurrence an integer of 1 to 3;

l is each independently at each occurrence an integer of 0 to 2;

m is each independently at each occurrence an integer of 0 to 2;

provided that, in the unit in parentheses with the subscript γ, the sum of k, l and m is 3;

$X^9$ each independently represents a single bond or a di- to decavalent organic group;

δ is each independently an integer of 1 to 9;

δ' is an integer of 1 to 9;

$R^d$ each independently at each occurrence represents $-Z'-CR^{81}_p R^{82}_q R^{83}_r$;

Z' each independently at each occurrence represents an oxygen atom or a divalent organic group;

$R^{81}$ each independently at each occurrence represents $R^{d'}$;

$R^{d'}$ has the same meaning as $R^d$;

in $R^d$, the number of C linearly connected via Z' group is at most 5;

$R^{82}$ each independently at each occurrence represents $-Y-SiR^{85}_j R^{86}_{3-j}$;

Y each independently at each occurrence represents a divalent organic group;

$R^{85}$ each independently at each occurrence represents a hydroxyl group or a hydrolyzable group;

$R^{86}$ each independently at each occurrence represents a hydrogen atom or a lower alkyl group;

j represents an integer of 1 to 3 independently for each $(-Y-SiR^{85}_j R^{86}_{3-j})$ unit;

$R^{83}$ each independently at each occurrence represents a hydrogen atom or a lower alkyl group;

p' is each independently at each occurrence an integer of 0 to 3;

q' is each independently at each occurrence an integer of 0 to 3;

r' is each independently at each occurrence an integer of 0 to 3;

$R^e$ each independently at each occurrence represents $-Y-SiR^{85}_j R^{86}_{3-j}$;

$R^f$ each independently at each occurrence represents a hydrogen atom or a lower alkyl group;

k' is each independently at each occurrence an integer of 0 to 3;

l' is each independently at each occurrence an integer of 0 to 3;

m' is each independently at each occurrence an integer of 0 to 3;

provided that, in the formula, at least one q' is 2 or 3 or at least one l' is 2 or 3;

$X^3$ each independently represents a single bond or a di- to decavalent organic group;

ε is each independently an integer of 1 to 9;

ε' is an integer of 1 to 9;

A each independently at each occurrence represents $-OH$, $-SH$, $-NR_2$, $-COOR$ or $-SO_3R$; and R represents a hydrogen atom or an alkyl group.

[2] The electrode according to [1], wherein the perfluoropolyether group-containing compound contained in the composition is a combination of a compound represented by formula (A1) and a compound represented by formula (A2), a combination of a compound represented by formula (B1) and a compound represented by formula (B2), a combination of a compound represented by formula (C1) and a compound represented by formula (C2), a combination of a compound represented by formula (D1) and a compound represented by formula (D2), or a combination of a compound represented by formula (E1) and a compound represented by formula (E2).

[3] The electrode according to [1] or [2], wherein the composition further comprises one or more fluorine-containing oils represented by formula (3):

$$R^{21}-(OC_4F_8)_{a'}-(OC_3F_6)_{b'}-(OC_2F_4)_{c'}-(OCF_2)_{d'}-R^{22} \quad (3)$$

wherein:

$R^{21}$ represents an alkyl group having 1 to 16 carbon atoms optionally substituted with one or more fluorine atoms;

$R^{22}$ represents an alkyl group having 1 to 16 carbon atoms optionally substituted with one or more fluorine atoms, a fluorine atom, or a hydrogen atom; and a', b', c' and d' represent the respective numbers of four repeating units in perfluoro(poly)ether constituting a main backbone of the polymer and are each independently an integer of 0 or more and 300 or less, the sum of a', b', c' and d' is at least 1, and the occurrence order of the respective repeating units in parentheses attached with subscript a', b', c' or d' is not limited in the formula.

[4] The electrode according to [3], wherein, in the composition, the compound represented by formula (3) is 0.1 mol % or more and 50 mol % or less based on the total amount of the compounds represented by formulae (A1), (B1), (C1), (D1) and (E1), the compounds represented by formulae (A2), (B2), (C2), (D2) and (E2), and the compound represented by formula (3) in total.

[5] The electrode according to any one of [1] to [4], wherein α, α', β, β' γ, γ', δ, δ', ε and ε' are 1.

[6] The electrode according to any one of [1] to [5], wherein A is $-OH$ or $-COOR$.

[7] The electrode according to any one of [1] to [5], wherein the perfluoropolyether group-containing compound is selected from perfluoropolyether compounds represented by formulae (A1), (A2), (B1), (B2), (C1), (C2), (D1) and (D2).

[8] The electrode according to any one of [1] to [5], wherein the perfluoropolyether group-containing compound is selected from perfluoropolyether compounds represented by formulae (A1), (A2), (C1), (C2), (D1) and (D2).

[9] The electrode according to any one of [7] and [8], wherein the perfluoropolyether group-containing compound has two or more Si atoms having a hydroxyl group or a hydrolyzable group at one end or both ends.

[10] The electrode according to any one of [7] to [9], wherein the perfluoropolyether group-containing compound has two or more Si atoms having a hydrolyzable group at one end or both ends.

[11] The electrode according to any one of [1] to [10], wherein PFPE at each occurrence is independently a group represented by the following formula (a), (b) or (c):

(a)

wherein $OC_3F_6$ is linear; and
d is an integer of 1 to 200;

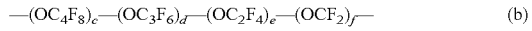

(b)

wherein $OC_2F_4$, $OC_3F_6$ and $OC_4F_8$ are linear;
c and d are each independently an integer of 0 or more and 30 or less;
e and f each independently represent an integer of 1 or more and 200 or less;
the sum of c, d, e and f is an integer of 10 or more and 200 or less; and
the occurrence order of the respective repeating units in parentheses with subscript c, d, e or f is not limited in the formula;

(c)

wherein $R^6$ represents $OCF_2$ or $OC_2F_4$;
$R^7$ represents a group selected from $OC_2F_4$, $OC_3F_6$, $OC_4F_8$, $OC_5F_{10}$ and $OC_6F_{12}$ or a combination of 2 or 3 groups selected from these groups;
$OC_2F_4$, $OC_3F_6$ and $OC_4F_8$ are linear; and
q is an integer of 2 to 100.

[12] The electrode according to any one of [1] to [11], wherein $X^1$, $X^3$, $X^5$, $X^7$ and $X^9$ are each independently a divalent group represented by the following formula:

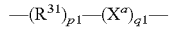

wherein:
$R^{31}$ represents a single bond, $-(CH_2)_{s'}$-, or o-, m- or p-phenylene group;
s' is an integer of 1 to 20;
$X^a$ represents $-(X^b)_{t'}-$;
$X^b$ each independently at each occurrence represents a group selected from the group consisting of $-O-$, $-S-$, an o-, m- or p-phenylene group, $-C(O)O-$, $-Si(R^{33})_2-$, $-(Si(R^{33})_2O)_{m''}-Si(R^{33})_2-$, $-CONR^{34}-$, $-O-CONR^{34}-$, $-NR^{34}-$ and $-(CH_2)_{n'}-$;
$R^{33}$ each independently at each occurrence represents a phenyl group, a $C_{1-6}$ alkyl group or a $C_{1-6}$ alkoxy group;
$R^{34}$ each independently at each occurrence represents a hydrogen atom, a phenyl group or a $C_{1-6}$ alkyl group;
m" is each independently at each occurrence an integer of 1 to 100;
n' is each independently at each occurrence an integer of 1 to 20;
l' is an integer of 1 to 10;
p1 is 0 or 1; and
q1 is 0 or 1;
provided that at least one of p1 and q1 is 1, and the occurrence order of the respective repeating units enclosed in parentheses with the subscript p1 or q1 is not limited.

[13] The electrode according to any one of [1] to [12], wherein $X^1$, $X^3$, $X^5$, $X^7$ and $X^9$ are each independently:
a single bond,
a $C_{1-20}$ alkylene group,
$(CH_2)_{s'}-X^c-$, or
$(CH_2)_{s'}-X^c-(CH_2)_{t'}-$
wherein:
$X^c$ represents $-O-$, $-CONR^{34}-$ or $-O-CONR^{34}-$;
$R^{34}$ each independently at each occurrence represents a hydrogen atom, a phenyl group or a $C_{1-6}$ alkyl group;
s' is an integer of 1 to 20; and
t' is an integer of 1 to 20.

[14] The electrode according to any one of [1] to [13], wherein the perfluoropolyether group-containing compound is a perfluoropolyether group-containing compound represented by formula (A1) and a perfluoropolyether group-containing compound represented by formula (A2).

[15] The electrode according to any one of [1] to [13], wherein the perfluoropolyether group-containing compound is a perfluoropolyether group-containing compound represented by formula (B1) and a perfluoropolyether group-containing compound represented by formula (B2).

[16] The electrode according to any one of [1] to [13], wherein the perfluoropolyether group-containing compound is a perfluoropolyether group-containing compound represented by formula (C1) and a perfluoropolyether group-containing compound represented by formula (C2).

[17] The electrode according to any one of [1] to [13], wherein the perfluoropolyether group-containing compound is a perfluoropolyether group-containing compound represented by formula (D1) and a perfluoropolyether group-containing compound represented by formula (D2).

[18] The electrode according to any one of [1] to [13], wherein the perfluoropolyether group-containing compound is a perfluoropolyether group-containing compound represented by formula (E1) and a perfluoropolyether group-containing compound represented by formula (E2).

[19] The electrode according to any one of [1] to [18], wherein the perfluoropolyether group-containing silane compound has a number average molecular weight of 1,000 to 30,000.

[20] An electrochemical device comprising the electrode according to any one of [1] to [19].

[21] The electrochemical device according to [20], wherein the electrochemical device is an alkali metal battery or an alkaline earth metal battery.

[22] The electrochemical device according to [21], wherein only a positive electrode of the alkali metal battery or the alkaline earth metal battery is the electrode according to any one of [1] to [19].

[23] The electrochemical device according to [21], wherein only a negative electrode of the alkali metal battery or the alkaline earth metal battery is the electrode according to any one of [1] to [19].

[24] The electrochemical device according to [21], wherein a positive electrode and a negative electrode of the alkali metal battery or the alkaline earth metal battery are the electrode according to any one of [1] to [19].

Effect of the Invention

According to the present disclosure, it is possible to suppress deterioration of an electrochemical device by using an electrode treated with a composition containing a perfluoropolyether group-containing compound and having a specific compositional features, in the electrochemical device.

EMBODIMENTS TO CARRY OUT THE INVENTION

<Electrode>

The electrode of the present disclosure has a coating layer formed from a composition containing a perfluoropolyether group-containing compound. More specifically, the electrode of the present disclosure (hereinafter, the electrode will be used for collectively referring to a positive electrode and a negative electrode) is constituted of an electrode material (hereinafter, the electrode material will be used for collectively referring to a positive electrode material and a negative electrode material) and a coating layer formed from a perfluoropolyether group-containing compound present on the surface of the electrode material.

Perfluoropolyether Group-Containing Compound

As described above, the electrode of the present disclosure has a coating layer formed from a composition containing a perfluoropolyether group-containing compound on the surface thereof.

It is not necessary to form the coating layer over the whole surface of the electrode material and sufficient to form the coating layer on the surface at which the electrode is in contact with an electrolyte. Preferably, the coating layer is formed over the whole surface of the electrode material.

The perfluoropolyether group-containing compound is not limited as long as it can form a coating layer thereof on the electrode surface.

In a preferable embodiment, the perfluoropolyether group-containing compound may be a compound represented by the following formula (A1), (A2), (B1), (B2), (C1), (C2), (D1), (D2), (E1) or (E2).

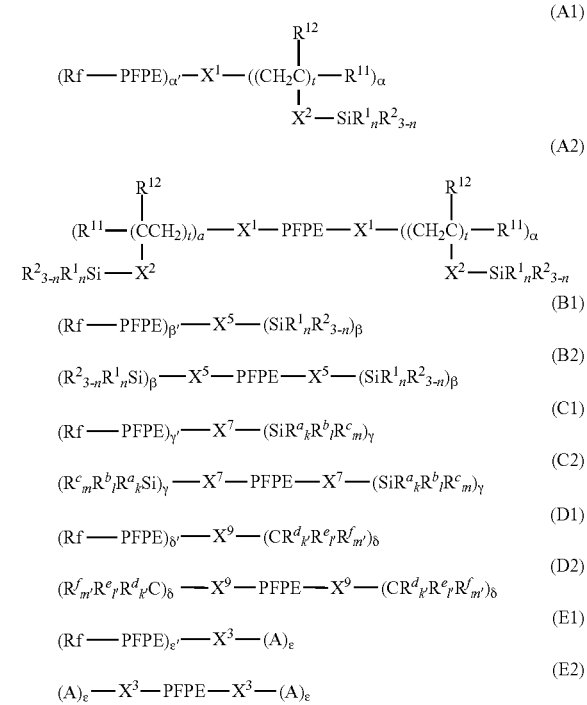

In the formulae, Rf each independently represents an alkyl group having 1 to 16 carbon atoms optionally substituted with one or more fluorine atoms.

The "alkyl group having 1 to 16 carbon atoms" in the alkyl group having 1 to 16 carbon atoms optionally substituted with one or more fluorine atoms may be linear or branched, and is preferably a linear or branched alkyl group having 1 to 6 carbon atoms, in particular, having 1 to 3 carbon atoms, more preferably a linear alkyl group having 1 to 3 carbon atoms.

Rf preferably represents an alkyl group having 1 to 16 carbon atoms substituted with one or more fluorine atoms, more preferably a $CF_2H-C_{1-15}$ fluoroalkylene group or a perfluoroalkyl group having 1 to 16 carbon atoms, further preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, in particular, having 1 to 3 carbon atoms, more preferably a linear perfluoroalkyl group having 1 to 3 carbon atoms, specifically $-CF_3$, $-CF_2CF_3$ or $-CF_2CF_2CF_3$.

In the above formulae, PFPE each independently represents $-(OC_6F_{12})_a-(OC_5F_{10})_b-(OC_4F_8)_c-(OC_3F_6)_d-(OC_2F_4)_e-(OCF_2)_f-$.

In the formula, a, b, c, d, e and f are each independently an integer of 0 or more and 200 or less, and the sum of a, b, c, d, e and f is at least 1. Preferably, a, b, c, d, e and f are each independently an integer of 0 or more and 100 or less. Preferably, the sum of a, b, c, d, e and f is 5 or more, more preferably 10 or more, for example, 10 or more and 100 or less. The occurrence order of the respective repeating units in parentheses with subscript a, b, c, d, e or f is not limited in the formula.

These repeating units may be linear or branched and are preferably linear. For example, the repeating unit, $-(OC_6F_{12})-$ may be, e.g., $-(OCF_2CF_2CF_2CF_2CF_2CF_2)-$, $(OCF(CF_3)CF_2CF_2CF_2CF_2)-$, $-(OCF_2CF(CF_3)CF_2CF_2CF_2)-$, $(OCF_2CF_2CF(CF_3)CF_2CF_2)-$, $-(OCF_2CF_2CF_2CF(CF_3)CF_2)-$, $(OCF_2CF_2CF_2CF_2CF(CF_3))-$; and is preferably $(OCF_2CF_2CF_2CF_2CF_2CF_2)-$. The repeating unit, $-(OC_5F_{10})-$ may be, e.g., $-(OCF_2CF_2CF_2CF_2CF_2)-$, $-(OCF(CF_3)CF_2CF_2CF_2)-$, $(OCF_2CF(CF_3)CF_2CF_2)-$, $-(OCF_2CF_2CF(CF_3)CF_2)-$, $(OCF_2CF_2CF_2CF(CF_3))$ and is preferably $-(OCF_2CF_2CF_2CF_2CF_2)-$. The repeating unit, $-(OC_4F_8)-$ may be any one of $(OCF_2CF_2CF_2CF_2)-$, $-(OCF(CF_3)CF_2CF_2)-$, $-(OCF_2CF(CF_3)CF_2)-$, $(OCF_2CF_2CF(CF_3))-$, $-(OC(CF_3)_2CF_2)-$, $-(OCF_2C(CF_3)_2)-$, $(OCF(CF_3)CF(CF_3))-$, $-(OCF(C_2F_5)CF_2)-$ and $-(OCF_2CF(C_2F_5))$ and is preferably $-(OCF_2CF_2CF_2CF_2)-$. The repeating unit, $-(OC_3F_6)-$ may be any one of $-(OCF_2CF_2CF_2)-$ $(OCF(CF_3)CF_2)-$ and $-(OCF_2CF(CF_3))-$, and is preferably $-(OCF_2CF_2CF_2)-$. The repeating unit, $-(OC_2F_4)-$ may be either one of $-(OCF_2CF_2)-$ and $-(OCF(CF_3))-$, and is preferably $-(OCF_2CF_2)-$.

In one embodiment, PFPE is each independently $-(OC_3F_6)_d-$ wherein d is an integer of 1 or more and 200 or less, preferably 5 or more and 200 or less, and more preferably 10 or more and 200 or less. Preferably, PFPE is each independently $-(OCF_2CF_2CF_2)_d-$ wherein d represents an integer of 1 or more and 200 or less, preferably 5 or more and 200 or less, and more preferably 10 or more and 200 or less or $-(OCF(CF_3)CF_2)_d-$ wherein d is an integer of 1 or more and 200 or less, preferably 5 or more and 200 or less, and more preferably 10 or more and 200 or less.

More preferably, PFPE is each independently —$(OCF_2CF_2CF_2)_d$— wherein d is an integer of 1 or more and 200 or less, preferably 5 or more and 200 or less, and more preferably or more and 200 or less.

In another embodiment, PFPE is each independently —$(OC_4F_8)_c$—$(OC_3F_6)_d$ $(OC_2F_4)_e$—$(OCF_2)_f$— wherein c and d are each independently an integer of 0 or more and 30 or less; e and f are each independently an integer of 1 or more and 200 or less, preferably 5 or more and 200 or less, and more preferably 10 or more and 200 or less; and the occurrence order of the respective repeating units in parentheses with subscript c, d, e and f is not limited in the formula. Preferably, PFPE is each independently —$(OCF_2CF_2CF_2CF_2)_c$—$(OCF_2CF_2CF_2)_d$—$(OCF_2CF_2)_e$—$(OCF_2)_f$—. In one embodiment, PFPE is each independently —$(OC_2F_4)_e(OCF_2)_f$— wherein e and f are each independently an integer of 1 or more and 200 or less, preferably 5 or more and 200 or less, and more preferably or more and 200 or less; and repeating units enclosed in parentheses attached with subscript e and f may are present in any order in the formula.

In another embodiment, PFPE is each independently a group represented by —$(R^6$—$R^7)_q$—. In the formula, $R^6$ is $OCF_2$ or $OC_2F_4$ and preferably $OC_2F_4$. In the formula, $R^7$ represents a group selected from $OC_2F_4$, $OC_3F_6$, $OC_4F_8$, $OC_5F_{10}$ and $OC_6F_{12}$ or a combination of 2 or 3 groups independently selected from these groups. Preferably, $R^7$ is a group selected from $OC_2F_4$, $OC_3F_6$ and $OC_4F_8$ or a combination of 2 or 3 groups independently selected from these groups. Examples of the combination of 2 or 3 groups independently selected from $OC_2F_4$, $OC_3F_6$ and $OC_4F_8$, include, but are not limited to, —$OC_2F_4OC_3F_6$—, —$OC_2F_4OC_4F_8$—, —$OC_3F_6OC_2F_4$—, $OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. The reference symbol q shown above is an integer of 2 to 100, and preferably an integer of 2 to 50. In the formula, $OC_2F_4$, $OC_3Fe$, $OC_4F_8$, $OC_5F_{10}$ and $OC_6F_{12}$ may be linear or branched, and are preferably linear. In this embodiment, preferably, PFPE is each independently —$(OC_2F_4OC_3F_6)_q$— or —$(OC_2F_4$—$OC_4F_8)_q$—.

In another embodiment, PFPE is each independently a group containing —$(OC_2F_4)_e$—. That is, PFPE is a group represented by —$(OC_6F_{12})_a$—$(OC_5F_{10})_b$—$(OC_4F_8)_c$—$(OC_3Fe)_d$—$(OC_2F_4)_e$—$(OCF_2)_f$—, wherein e is an integer of 1 or more and 200 or less, a, b, c, d and f are each independently an integer of 0 or more and 200 or less, and the sum of a, b, c, d, e and f is at least 1. Preferably, e is an integer of 1 or more and 100 or less, more preferably 5 or more and 100 or less. Preferably, the sum of a, b, c, d, e and f is 5 or more, more preferably 10 or more, for example, 10 or more and 100 or less. The occurrence order of the respective repeating units in parentheses with subscript a, b, c, d, e or f is not limited in the formula.

In a preferable embodiment, PFPE is at each occurrence independently a group represented by the following formula (a), (b) or (c):

$$—(OC_3F_6)_d— \qquad (a)$$

wherein $OC_3F_6$ is linear; and
d is an integer of 1 to 200;

$$—(OC_4F_8)_c—(OC_3F_6)_d—(OC_2F_4)_e—(OCF_2)_f— \qquad (b)$$

wherein $OC_2F_4$, $OC_3F_6$ and $OC_4F_8$ are linear;

c and d are each independently an integer of 0 or more and 30 or less;

e and f are each independently an integer of 1 or more and 200 or less;

the sum of c, d, e and f is an integer of 10 or more and 200 or less; and the occurrence order of the respective repeating units in parentheses with subscript c, d, e or f is not limited in the formula;

$$—(R^6—R^7)_q— \qquad (c)$$

wherein $R^6$ is $OCF_2$ or $OC_2F_4$;

$R^7$ is a group selected from $OC_2F_4$, $OC_3F_6$, $OC_4F_8$, $OC_5F_{10}$ and $OC_6F_{12}$ or a combination of 2 or 3 groups selected from these groups;

$OC_2F_4$, $OC_3F_6$ and $OC_4F_8$ are linear; and
q is an integer of 2 to 100.

In a more preferable embodiment, PFPE is at each occurrence independently a group represented by the following formula (a) or (b):

$$—(OC_3F_6)_d— \qquad (a)$$

wherein $OC_3F_6$ is linear; and
d is an integer of 1 to 200;

$$—(OC_4F_8)_c—(OC_3F_6)_d—(OC_2F_4)_e—(OCF_2)_f— \qquad (b)$$

wherein $OC_2F_4$, $OC_3F_6$ and $OC_4F_8$ are linear;

c and d are each independently an integer of 0 or more and 30 or less;

e and f are each independently an integer of 1 or more and 200 or less;

the sum of c, d, e and f is an integer of 10 or more and 200 or less; and the occurrence order of the respective repeating units in parentheses with subscript c, d, e or f is not limited in the formula.

In the above formulae, $R^1$ each independently at each occurrence represents a hydrogen atom or an alkyl group having 1 to 22 carbon atoms, and preferably an alkyl group having 1 to 4 carbon atoms.

In the above formulae, $R^2$ each independently at each occurrence represents a hydroxyl group or a hydrolyzable group.

The "hydrolyzable group" as used herein refers to a group that can be removed from a main backbone of a compound by a hydrolysis reaction. Examples of the hydrolyzable group include —OR, —OCOR, —O—N=$CR_2$, —$NR_2$, —NHR and halogen (in these formulae, R represents a substituted or unsubstituted alkyl group having 1 to 4 carbon atoms), and the hydrolyzable group is preferably —OR (i.e., alkoxy group). Examples of R include unsubstituted alkyl groups such as a methyl group, an ethyl group, a propyl group, an isopropyl group, a n-butyl group and an isobutyl group; and a substituted alkyl group such as a chloromethyl group. Of them, an alkyl group, particularly, an unsubstituted alkyl group is preferable; and a methyl group or an ethyl group is more preferable. The hydroxyl group, for example, may be generated by hydrolyzing the hydrolyzable group though it is not limited thereto.

In the above formulae, $R^{11}$ each independently at each occurrence represents a hydrogen atom or a halogen atom. The halogen atom is preferably an iodine atom, a chlorine atom or a fluorine atom, and more preferably a fluorine atom.

In the above formulae, $R^{12}$ each independently at each occurrence represents a hydrogen atom or a lower alkyl group. The lower alkyl group is preferably an alkyl group having 1 to 20 carbon atoms, and more preferably an alkyl group having 1 to 6 carbon atoms, such as a methyl group, an ethyl group and a propyl group.

In the above formulae, n is independently an integer of 0 to 3 in each $(SiR^1{}_nR^2{}_{3-n})$ unit, preferably an integer of 0 to 2, and more preferably 0. It is noted that, n does not simultaneously is 0 in the all formulae. In other words, in the formulae, at least one $R^2$ is present.

In the above formulae, t is each independently an integer of 1 to 10. In a preferable embodiment, t is an integer of 1 to 6. In another preferable embodiment, t is an integer of 2 to 10, and preferably an integer of 2 to 6.

In the above formulae, $X^2$ each independently at each occurrence represents a single bond or a divalent organic group. $X^2$ is preferably an alkylene group having 1 to 20 carbon atoms, and more preferably —$(CH_2)_u$— wherein u represents an integer of 0 to 2.

In the above formulae, $R^a$ each independently at each occurrence represents —Z—$SiR^{71}{}_pR^{72}{}_qR^{73}{}_r$.

In the formula, Z each independently at each occurrence represents an oxygen atom or a divalent organic group.

Z preferably is a divalent organic group. In a preferable embodiment, Z is not a group which forms a siloxane bond with a Si atom (to which $R^a$ is bound) present at an end of the molecular backbone in formula (C1) or formula (C2).

Z is preferably a $C_{1-6}$ alkylene group, —$(CH_2)_g$—O—$(CH_2)_h$— wherein g is an integer of 1 to 6; and h is an integer of 1 to 6 or -phenylene-$(CH_2)_i$— wherein i is an integer of 0 to 6; and more preferably a $C_{1-3}$ alkylene group. These groups may be substituted with at least one substituent selected from, e.g., a fluorine atom, a $C_{1-6}$ alkyl group, a $C_{2-6}$ alkenyl group and a $C_{2-6}$ alkynyl group.

In the above formulae, $R^{71}$ each independently at each occurrence represents $R^{a\prime}$. $R^{a\prime}$ has the same definition as $R^a$.

In $R^a$, the number of Si atoms linearly connected via group Z is at most 5. In $R^a$, when at least single $R^{71}$ is present, the number of Si atoms linearly connected via group Z is two or more; and the number of Si atoms linearly connected via group Z is at most 5. Note that, "the number of Si atoms linearly connected via group Z in $R^a$" is equal to the number of repeats of —Z—Si— linearly connected with each other in $R^a$.

More specifically, an example of the case where Si atoms are connected via group Z in $R^a$ is shown below:

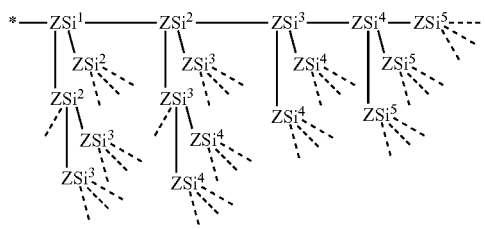

In the above formula, mark * represents a site to be bound to the Si atom of the main chain; mark " . . . " means that a prescribed group except ZSi is bound. More specifically, when three bonds of a Si atom are all expressed by " . . . ", the repeat of ZSi ends there. The numeral on the right shoulder of Si indicates the number (occurrence number) of Si atoms linearly connected via group Z and counted from the side *. To describe more specifically, a chain in which the repeat of ZSi is completed at $Si^2$ means that "the number of Si atoms linearly connected via group Z in $R^a$" is 2.

Similarly, chains in which the repeat of ZSi is completed at $Si^3$, $Si^4$ and $Si^5$ means that "the number of Si atoms linearly connected via group Z in $R^a$" are 3, 4 and 5, respectively. It is noted that, as is apparent from the above formulae, a plurality of ZSi chains are present in $R^a$; and it is not necessary that these ZSi chains all have the same length and the lengths of the chains may be arbitrarily set.

In a preferable embodiment, as shown below, "the numbers of Si atoms linearly connected via group Z in $R^a$" in all chains is one (the left formula below) or two (the right formula below).

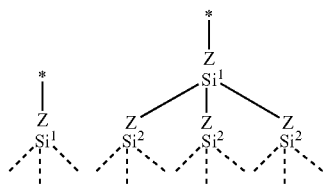

In one embodiment, the number of Si atoms linearly connected via group Z in $R^a$ is one or two and preferably one.

In the formula, $R^{72}$ each independently at each occurrence represents a hydroxyl group or a hydrolyzable group.

Preferably, $R^{72}$ is —OR wherein R represents a substituted or unsubstituted $C_{1-3}$ alkyl group, and more preferably a methyl group.

In the formula, $R^{73}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formula, p is each independently at each occurrence an integer of 0 to 3; q is each independently at each occurrence an integer of 0 to 3; r is each independently at each occurrence 0 to 3; and, the sum of p, q and r is 3.

In a preferable embodiment, in $R^{a\prime}$ at an end of $R^a$ (when $R^{a\prime}$ is not present, $R^a$ itself), q is preferably an integer of 2 or more; for example, an integer of 2 or 3, and more preferably 3.

In a preferable embodiment, $R^a$ may have at least one —Si(—Z—$SiR^{72}{}_qR^{73}{}_r)_2$ or —Si(—Z—$SiR^{72}{}_qR^{73}{}_r)_3$ at an end, and preferably —Si(—Z—$SiR^{72}{}_qR^{73}{}_r)_3$. In the formulae, the unit of (—Z—$SiR^{72}{}_qR^{73}{}_r$) is preferably (—Z—$SiR^{72}{}_3$). In a further preferable embodiment, the ends of $R^a$ may be all —Si(—Z—$SiR^{72}{}_qR^{73}{}_r)_3$ and preferably —Si(—Z—$SiR^{72}{}_3)_3$.

In the above formulae (C1) and (C2), at least one $R^{72}$ is present.

In the above formulae, $R^b$ each independently at each occurrence represents a hydroxyl group or a hydrolyzable group.

$R^b$ is preferably a hydroxyl group, —OR, —OCOR, —O—N=$C(R)_2$, —$N(R)_2$, —NHR or halogen (in these formulae, R represents a substituted or unsubstituted alkyl group having 1 to 4 carbon atoms) and preferably —OR. Examples of R include an unsubstituted alkyl group such as a methyl group, an ethyl group, a propyl group, an isopropyl group, a n-butyl group and an isobutyl group; and a substituted alkyl group such as a chloromethyl group. Among them, an alkyl group, particularly an unsubstituted alkyl group, is preferable, a methyl group or an ethyl group is more preferable. The hydroxyl group, although it is not limited, may be generated by hydrolysis of a hydrolyzable group. More preferably, $R^c$ is —OR wherein R represents a substituted or unsubstituted $C_{1-3}$ alkyl group, and more preferably a methyl group.

In the above formulae, $R^c$ each independently at each occurrence represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the above formulae, k is each independently at each occurrence an integer of 0 to 3; l is each independently at each occurrence an integer 0 to 3; m is each independently at each occurrence an integer of 0 to 3. Note that, the sum of k, l and m is 3.

In the above formulae, $R^d$ each independently at each occurrence represents —Z'—$CR^{81}_p R^{82}_q R^{83}_r$.

Z' each independently at each occurrence represents an oxygen atom or a divalent organic group.

Z' is preferably a $C_{1-6}$ alkylene group, —$(CH_2)_g$—O—$(CH_2)_h$— wherein g is an integer of 0 to 6; for example, an integer of 1 to 6, and h is an integer of 0 to 6; for example, an integer of 1 to 6 or, -phenylene-$(CH_2)_i$— wherein i is an integer of 0 to 6, and more preferably a $C_{1-3}$ alkylene group. These groups may be substituted with at least one substituent selected from, for example, a fluorine atom, a $C_{1-6}$ alkyl group, a $C_{2-6}$ alkenyl group and a $C_{2-6}$ alkynyl group.

In the formula, $R^{81}$ each independently at each occurrence represents $R^{d'}$. $R^{d'}$ has the same meaning as $R^d$.

In $R^d$, the number of C atoms linearly connected via group Z' is at most 5. In $R^d$, when at least one $R^{81}$ is present, the number of Si atoms linearly connected via group Z' is two or more; and the number of C atoms linearly connected via group Z' is at most 5. Note that, "the number of C atoms linearly connected via group Z' in $R^d$" is equal to the number of repeats of —Z'—C— linearly connected in $R^d$.

In a preferable embodiment, as shown below, "the numbers of C atoms linearly connected via group Z' in $R^d$" in all chains is one (the left formula below) or two (the right formula below).

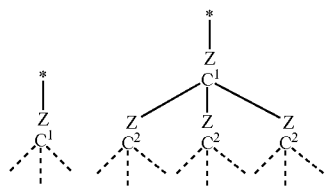

In one embodiment, the number of C atoms linearly connected via group Z' in $R^d$ is one or two and preferably one.

In the formula, $R^{82}$ represents —Y—$SiR^{85}_j R^{86}_{3-j}$.

Y each independently at each occurrence represents a divalent organic group.

In a preferable embodiment, Y is a $C_{1-6}$ alkylene group, —$(CH_2)_{g'}$—O—$(CH_2)_{h'}$—, wherein g' is an integer of 0 to 6, for example, an integer of 1 to 6, and h' is an integer of 0 to 6, for example, an integer of 1 to 6, or -phenylene-$(CH_2)_{i'}$—, wherein i' is an integer of 0 to 6. These groups may be substituted, for example, with at least one substituent selected from a fluorine atom, a $C_{1-6}$ alkyl group, a $C_{2-6}$ alkenyl group and a $C_{2-6}$ alkynyl group.

In one embodiment, Y may be a $C_{1-6}$ alkylene group or -phenylene-$(CH_2)_{i'}$—. In the case where Y is any of the groups, light resistance, in particular, ultraviolet resistance can be more enhanced.

$R^{85}$ each independently at each occurrence represents a hydroxyl group or a hydrolyzable group. Examples of the "hydrolyzable group" are as defined above.

Preferably, $R^{85}$ is —OR, wherein R represents a substituted or unsubstituted $C_{1-3}$ alkyl group, more preferably an ethyl group or a methyl group, in particular, a methyl group.

$R^{86}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, further preferably a methyl group.

The reference symbol j independently represents an integer of 1 to 3 in each (—Y—$SiR^{85}_j R^{86}_{3-j}$) unit, and is preferably an integer of 2 or 3, and more preferably, 3.

$R^{83}$ each independently at each occurrence represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formula, p' is each independently at each occurrence an integer 0 to 3; q' is each independently at each occurrence an integer of 0 to 3; r' is each independently at each occurrence an integer of 0 to 3; and the sum of p', q' and r' is 3.

In a preferable embodiment, in $R^{d'}$ at an end of $R^d$ (when $R^{d'}$ is not present, $R^d$ itself), q' is preferably 2 or more; for example, 2 or 3, more preferably 3.

In the above formulae, $R^e$ each independently at each occurrence represents —Y—$SiR^{85}_j R^{86}_{3-j}$, wherein Y, $R^{85}$, $R^{86}$ and j are as defined for $R^{82}$ above.

In the above formulae, $R^f$ each independently at each occurrence represents a hydrogen atom or a lower alkyl group. The lower alkyl group is preferably an alkyl group having 1 to 20 carbon atoms, more preferably an alkyl group having 1 to 6 carbon atoms, further preferably a methyl group.

In the formulae, k' is each independently at each occurrence an integer of 0 to 3; l' is each independently at each occurrence an integer of 0 to 3; and m' is each independently at each occurrence an integer of 0 to 3; and the sum of k', l' and m' is 3.

In one embodiment, at least one k' is 2 or 3 and preferably 3.

In one embodiment, k' is 2 or 3 and preferably 3.
In one embodiment, l' is 2 or 3 and preferably 3.
In the above formulae (D1) and (D2), at least one q' is 2 or 3 or at least one l' is 2 or 3. In other words, in the formulae, at least two Y—$SiR^{85}_j R^{86}_{3-j}$ groups are present.

In the above formulae, A each independently at each occurrence represents —OH, —SH, —$NH_2$, —COOR or —$SO_3R$. In the formulae, R is a hydrogen atom or an alkyl group. The alkyl group is preferably an alkyl group having 1 to 3 carbon atoms, more preferably a methyl group. Preferably, A may be —OH or —COOR.

In the formulae, $X^1$ each independently represents a single bond or a di- to decavalent organic group. $X^1$ in compounds represented by formulae (A1) and (A2) is interpreted as a linker connecting a perfluoropolyether moiety (i.e., Rf—PFPE moiety or —PFPE- moiety) which mainly provides, e.g., water-repellency and surface lubricity, and a silane moiety (i.e., a group enclosed in parentheses attached with α) which provides binding ability to a substrate. Thus, $X^1$ may be any organic group as long as the compounds represented by formulae (A1) and (A2) can be stably present.

In the above formulae, α is an integer of 1 to 9, and α' is an integer of 1 to 9. The value of α and α' can vary depending on the valence of $X^1$. In formula (A1), the sum of α and α' is equal to the valence of $X^1$. For example, when $X^1$ is a decavalent organic group, the sum of α and α' is 10, and for example, α can be 9 and α' can be 1, α can be 5 and α' can be 5, or α can be 1 and α' can be 9. When $X^1$ is a divalent organic group, α and α' each are 1. In formula (A2), the value of α is obtained by subtracting 1 from the valence of $X^1$.

$X^1$ is preferably a di- to heptavalent, more preferably di- to tetravalent, further preferably divalent organic group.

In one embodiment, $X^1$ is a di- to tetravalent organic group, α is 1 to 3, and α' is 1.

In another embodiment, $X^1$ represents a divalent organic group; α represents 1; and α' represents 1. In this case, formulae (A1) and (A2) are represented by the following formulae (A1') and (A2'), respectively.

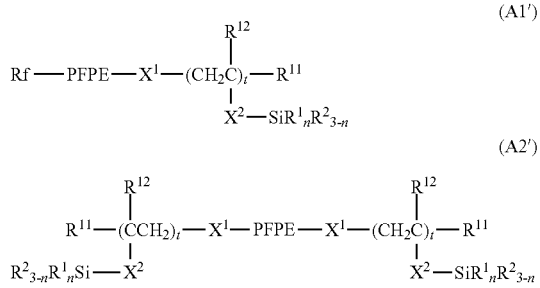

In the above formulae, $X^5$ each independently represents a single bond or a di- to decavalent organic group. $X^5$ in compounds represented by formulae (B1) and (B2) is interpreted as a linker connecting a perfluoropolyether moiety (Rf—PFPE moiety or —PFPE- moiety) which mainly provides, e.g., water-repellency and surface lubricity, and a silane moiety (i.e., —$SiR^1_nR^2_{3-n}$) which provides binding ability to a substrate. Thus, $X^5$ may be any organic group as long as compounds represented by formulae (B1) and (B2) can be stably present.

In the above formulae, β is an integer of 1 to 9 and β' is an integer of 1 to 9. The value of β and β' are determined in accordance with the valence of $X^5$. In formula (B1), the sum of β and β' is equal to the valence of $X^5$. For example, when $X^5$ is a decavalent organic group, the sum of β and β' is 10, and for example, β can be 9 and β' can be 1, β can be 5 and β' can be 5, or β can be 1 and β' can be 9. When $X^5$ is a divalent organic group, β and β' each are 1. In formula (B2), the value of β is obtained by subtracting 1 from the valence of $X^5$.

$X^5$ is preferably a di- to heptavalent, more preferably di- to tetravalent, further preferably divalent organic group.

In one embodiment, $X^5$ is a di- to tetravalent organic group; β is an integer of 1 to 3; and β' represents 1.

In another embodiment, $X^5$ represents a divalent organic group; β represents 1; and β' represents 1. In this case, formulae (B1) and (B2) are represented by the following formulae (B1') and (B2'), respectively.

Rf—PFPE-$X^5$—$SiR^5_nR^2_{3-n}$ (B1')

$R^2_{3-n}R^1_nSi$—$X^5$—PFPE-$X^5$—$SiR^1_nR^2_{3-n}$ (B2')

In the above formulae, $X^7$ each independently represents a single bond or a di- to decavalent organic group. $X^7$ in compounds represented by formulae (C1) and (C2) is interpreted as a linker connecting a perfluoropolyether moiety (Rf—PFPE moiety or —PFPE- moiety) which mainly provides, e.g., water-repellency and surface lubricity, and a silane moiety (i.e., —$SiR^a_kR^b_lR^c_m$ group) which provides binding ability to a substrate. Thus, $X^7$ may be any organic group as long as compounds represented by formulae (C1) and (C2) can be stably present.

In the above formulae, γ is an integer of 1 to 9 and γ' is an integer of 1 to 9. The value of γ and γ' are determined in accordance with the valence of $X^7$. In formula ($C_1$), the sum of γ and γ' is equal to the valence of $X^7$. For example, when $X^7$ is a decavalent organic group, the sum of γ and γ' is 10, and for example, γ can be 9 and γ' can be 1, γ can be 5 and γ' can be 5, or γ can be 1 and γ' can be 9. When $X^7$ is a divalent organic group, γ and γ' each are 1. In formula (C2), the value of γ is obtained by subtracting 1 from the valence of $X^7$.

$X^7$ is preferably a di- to heptavalent, more preferably di- to tetravalent, further preferably divalent organic group.

In one embodiment, $X^7$ is a di- to tetravalent organic group, γ is an integer of 1 to 3, and γ' is 1.

In another embodiment, $X^7$ is a divalent organic group, γ is 1, and γ' is 1. In this case, formulae (C1) and (C2) are represented by the following formulae (C1') and (C2'), respectively.

Rf—PFPE-$X^7$—$SiR^a_kR^b_lR^c_m$ (C1')

$R^c_mR^b_lR^a_kSi$—$X^7$—PFPE-$X^7$—$SiR^a_kR^b_lR^c_m$(C2')

In the above formulae, $X^9$ each independently represents a single bond or a di- to decavalent organic group. $X^9$ in compounds represented by formulae (D1) and (D2) is interpreted as a linker connecting a perfluoropolyether moiety (i.e., Rf—PFPE moiety or —PFPE-moiety) which mainly provides, e.g., water-repellency and surface lubricity, and a moiety (i.e., a group enclosed in parentheses attached with δ) providing binding ability to a substrate. Thus, $X^9$ may be any organic group as long as the compounds represented by formulae (D1) and (D2) can be stably present.

In the above formulae, δ is an integer of 1 to 9 and δ' is an integer of 1 to 9. The value of δ and δ' can vary depending on the valence of $X^9$. In formula (D1), the sum of δ and δ' is equal to the valence of $X^9$. For example, when $X^9$ is a decavalent organic group, the sum of δ and δ' is 10, and for example, δ can be 9 and δ' can be 1, δ can be 5 and δ' can be 5, or δ can be 1 and δ' can be 9. When $X^9$ is a divalent organic group, δ and δ' each are 1. In formula (D2), the value of 5 is obtained by subtracting 1 from the valence of $X^9$.

$X^9$ is preferably a di- to heptavalent, more preferably di- to tetravalent, further preferably divalent organic group.

In one embodiment, $X^9$ is a di- to tetravalent organic group, δ is 1 to 3, and δ' is 1.

In another embodiment, $X^9$ is a divalent organic group, δ is 1, and δ' is 1. In this a case, formulae (D1) and (D2) are represented by the following formulae (D1') and (D2'), respectively.

Rf—PFPE-$X^9$—$CR^d_kR^e_lR^f_{m'}$ (D1')

$R^f_{m'}R^e_lR^d_kC_\delta$—$X^5$—PFPE-$X^9$—$CR^d_kR^e_lR^f_{m'}$ (D2')

In the above formulae, $X^3$ each independently represents a single bond or a di- to decavalent organic group. $X^3$ in compounds represented by formulae (E1) and (E2) is interpreted as a linker connecting a perfluoropolyether moiety (i.e., Rf—PFPE moiety or —PFPE-moiety) which mainly provides, e.g., water-repellency and surface lubricity, and a moiety (i.e., group A) providing binding ability to a substrate. Thus, $X^3$ may be any organic group as long as the compounds represented by formulae (E1) and (E2) can be stably present.

In the above formulae, s is an integer of 1 to 9 and ε' is an integer of 1 to 9. The value of ε and ε' can vary depending on the valence of $X^3$. In formula (E1), the sum of ε and ε' is equal to the valence of $X^3$. For example, when $X^3$ is a decavalent organic group, the sum of ε and ε' is 10, and, for example, s can be 9 and ε' can be 1, s can be 5 and ε' can be 5, or ε can be 1 and ε' can be 9. When $X^3$ is a divalent organic group, ε and ε' each are 1. In formula (E2), the value of s is obtained by subtracting 1 from the valence of $X^9$.

$X^3$ is preferably a di- to heptavalent, more preferably di- to tetravalent, further preferably divalent organic group.

In one embodiment, $X^3$ is a di- to tetravalent organic group, s is an integer of 1 to 3, and ε' represents 1.

In another embodiment, $X^3$ is a divalent organic group, ε is 1, and ε' is 1. In this case, formulae (E1) and (E2) are represented by the following formulae (E1') and (E2'), respectively.

  (E1')

  (E2')

In a preferable embodiment, $X^1$, $X^3$, $X^5$, $X^7$ and $X^9$, although they are not limited, may be each independently, for example, a divalent group represented by the following formula:

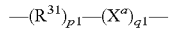

wherein:
$R^{31}$ represents a single bond, —$(CH_2)_{s'}$—, or an o-, m- or p-phenylene group, and is preferably —$(CH_2)_{s'}$—;
s' is an integer of 1 to 20, preferably 1 to 6, more preferably 1 to 3 and even more preferably 1 or 2;
$X^a$ represents —$(X^b)_{l'}$—;
$X^b$ each independently at each occurrence represents a group selected from the group consisting of —O—, —S—, an o-, m- or p-phenylene group, —C(O)O—, —Si($R^{33}$)$_2$—, —(Si($R^{33}$)$_2$O)$_{m''}$—Si($R^{33}$)$_2$—, —CON$R^{34}$—, —O—CON$R^{34}$—, —N$R^{34}$— and —$(CH_2)_{n'}$—;
$R^{33}$ each independently at each occurrence represents a phenyl group, a $C_{1-6}$ alkyl group or a $C_{1-6}$ alkoxy group, and is preferably a phenyl group or a $C_{1-6}$ alkyl group, more preferably a methyl group;
$R^{34}$ each independently at each occurrence represents a hydrogen atom, a phenyl group or a $C_{1-6}$ alkyl group (preferably a methyl group);
m" is each independently at each occurrence an integer of 1 to 100 and preferably an integer of 1 to 20;
n' is each independently at each occurrence an integer of 1 to 20, preferably an integer of 1 to 6, and more preferably an integer of 1 to 3;
l' is an integer of 1 to 10, preferably an integer of 1 to 5, and more preferably an integer of 1 to 3;
p1 is 0 or 1; and
q1 is 0 or 1,
provided that at least one of p1 and q1 is 1, and the occurrence order of the respective repeating units in parentheses with subscript p1 or q1 is not limited.

Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

In one embodiment, $X^1$, $X^3$, $X^5$, $X^7$ and $X^9$ may be each independently a divalent group represented by:

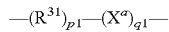

wherein:
$R^{31}$ represents —$(CH_2)_{s'}$—;
s' is an integer of 1 to 20;
$X^a$ represents —$(X^b)_{l'}$—;
$X^b$ each independently at each occurrence represents a group selected from the group consisting of —O—, —CON$R^{34}$—, —O—CON$R^{34}$— and —$(CH_2)_{n'}$—;
$R^{34}$ each independently at each occurrence represents a hydrogen atom, a phenyl group or a $C_{1-6}$ alkyl group;
n' is each independently at each occurrence represents integer of 1 to 20;
l' is an integer of 1 to 10;
p1 is 0 or 1; and
q1 is 0 or 1,
provided that at least one of p1 and q1 is 1, and the occurrence order of the respective repeating units in parentheses with p1 or q1 is not limited. Here, $R^{31}$ and $X^a$ (typically, any hydrogen atom in $R^{31}$ and $X^a$) are each optionally substituted with one or more substituents selected from a fluorine atom, a $C_{1-3}$ alkyl group and a $C_{1-3}$ fluoroalkyl group.

Preferably, $X^1$, $X^3$, $X^5$, $X^7$ and $X^9$ are each independently —$(R^{31})_{p1}$—$(X^a)_{q1}$—$R^{32}$—. $R^{32}$ represents a single bond, —$(CH_2)_{t'}$— or an o-, m- or p-phenylene group, and is preferably —$(CH_2)_{t'}$— is an integer of 1 to 20, preferably an integer of 2 to 6, more preferably an integer of 2 or 3. $R^{32}$ (typically, a hydrogen atom of $R^{32}$) herein is optionally substituted with at least one substituent selected from a fluorine atom, a $C_{1-3}$ alkyl group and a $C_{1-3}$ fluoroalkyl group.

Preferably, $X^1$, $X^3$, $X^5$, $X^7$ and $X^9$ may be each independently:
a single bond,
a $C_{1-20}$ alkylene group,
—$R^{31}$—$X^c$—$R^{32}$—, or
—$X^d$—$R^{32}$—
wherein $R^{31}$ and $R^{32}$ are as defined above.

More preferably, $X^1$, $X^3$, $X^5$, $X^7$ and $X^9$ are each independently:
a single bond,
a $C_{1-20}$ alkylene group,
$(CH_2)_{s'}$—$X^c$—,
$(CH_2)_{s'}$—$X^c$—$(CH_2)_{t'}$—
—$X^d$—, or
—$X^d$—$(CH_2)_{t'}$—
wherein s' and t' are as defined above.

In the above formulae, $X^c$ represents:
—O—,
—S—,
—C(O)O—,
—CON$R^{34}$—,
—O—CON$R^{34}$—,
—Si($R^{33}$)$_2$—,
(Si($R^{33}$)$_2$O)$_{m''}$—Si($R^{33}$)$_2$—,
—O—$(CH_2)_{u'}$—(Si($R^{33}$)$_2$O)$_{m''}$—Si($R^{33}$)$_2$—,
—O—$(CH_2)_{u'}$—Si($R^{33}$)$_2$—O—Si($R^{33}$)$_2$—$CH_2CH_2$—Si($R^{33}$)$_2$—O—Si($R^{33}$)$_2$—,
—O—$(CH_2)_{u'}$—Si(OCH$_3$)$_2$OSi(OCH$_3$)$_2$—,
—CON$R^{34}$—$(CH_2)_{u'}$—(Si($R^{33}$)$_2$O)$_{m''}$—Si($R^{33}$)$_2$—,
—CON$R^{34}$—$(CH_2)_{u'}$—N($R^{34}$)—, or
—CON$R^{34}$-(o-, m- or p-phenylene)-Si($R^{33}$)$_2$—
wherein $R^{33}$, $R^{34}$ and m" are as defined above, and u' is an integer of 1 to 20, preferably an integer of 2 to 6, more preferably an integer of 2 or 3. $X^c$ is preferably —O—.

In the above formulae, $X^d$ represents:
—S—,
—C(O)O—,
—CONR$^{34}$—,
—CONR$^{34}$—(CH$_2$)$_{u'}$—(Si(R$^{33}$)$_2$O)$_{m''}$—Si(R$^{33}$)$_2$—,
—CONR$^{34}$—(CH$_2$)$_{u'}$—N(R$^{34}$)—, or
—CONR$^{34}$-(o-, m- or p-phenylene)-Si(R$^{33}$)$_2$—
wherein each symbol has the same meaning as above.

More preferably, $X^1$, $X^3$, $X^5$, $X^7$ and $X^9$ may be each independently:
a single bond,
a C$_{1-20}$ alkylene group,
(CH$_2$)$_{s'}$—X$^c$—(CH$_2$)$_{t'}$—, or
—X$^d$—(CH$_2$)$_{t'}$—
wherein each symbol is as defined above.

In a preferable embodiment, $X^1$, $X^3$, $X^5$, $X^7$ and $X^9$ may be each independently:
a single bond,
a C$_{1-20}$ alkylene group,
—(CH$_2$)$_{s'}$—X$^c$—, or
—(CH$_2$)$_{s'}$—X$^c$—(CH$_2$)$_{t'}$—
wherein:
$X^c$ is —O—, —CONR$^{34}$— or —O—CONR$^{34}$—;
R$^{34}$ each independently at each occurrence represents a hydrogen atom, a phenyl group or a C$_{1-6}$ alkyl group;
s' is an integer of 1 to 20; and
t' is an integer of 1 to 20.

In one embodiment, $X^1$, $X^3$, $X^5$, $X^7$ and $X^9$ are each independently:
a single bond,
a C$_{1-20}$ alkylene group,
—(CH$_2$)$_{s'}$—O—(CH$_2$)$_{t'}$—,
—(CH$_2$)$_{s'}$—(Si(R$^{33}$)$_2$O) m"—Si(R$^{33}$)$_2$—(CH$_2$)$_{t'}$—,
—(CH$_2$)$_{s'}$—O—(CH$_2$)$_{u'}$—(Si(R$^{33}$)$_2$O)$_{m''}$—Si(R$^{33}$)$_2$—(CH$_2$)$_{t'}$—, or
—(CH$_2$)$_{s'}$—O—(CH$_2$)$_{t'}$—Si(R$^{33}$)$_2$—(CH$_2$)$_{u'}$—Si(R$^{33}$)$_2$—(C$_v$H$_{2v}$)—
wherein R$^{33}$, m", s', t' and u' are as defined above, and v is an integer of 1 to 20, preferably an integer of 2 to 6 and more preferably an integer of 2 or 3.

In the above formula, —(C$_v$H$_{2v}$)— may be linear or branched, and may be, for example, —CH$_2$CH$_2$—, —CH$_2$CH$_2$CH$_2$—, —CH(CH$_3$)— or —CH(CH$_3$)CH$_2$—.

Groups represented by $X^1$, $X^3$, $X^5$, $X^7$ and $X^9$ are each independently optionally substituted with at least one substituent selected from a fluorine atom, a C$_{1-3}$ alkyl group and a C$_{1-3}$ fluoroalkyl group (preferably a C$_{1-3}$ perfluoroalkyl group).

In one embodiment, groups represented by $X^1$, $X^3$, $X^5$, $X^7$ and $X^9$ may be each independently groups other than a —O—C$_{1-6}$ alkylene group.

In another embodiment, examples of the groups represented by $X^1$, $X^3$, $X^5$, $X^7$ and $X^9$ include the following groups:

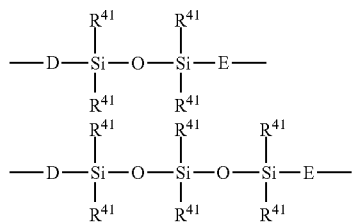

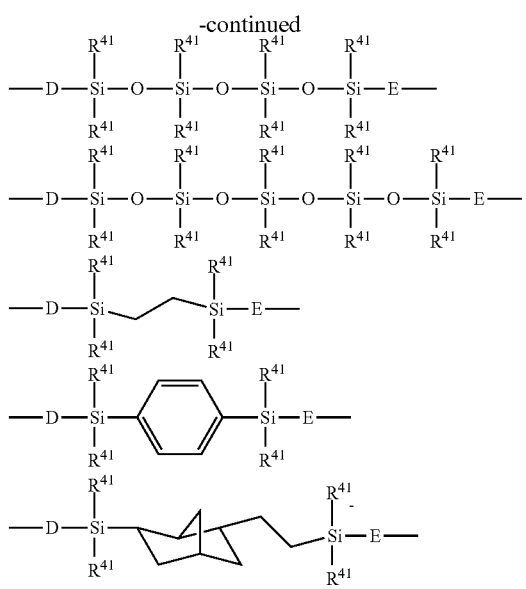

wherein R$^{41}$ is each independently a hydrogen atom, a phenyl group, an alkyl group having 1 to 6 carbon atoms or a C$_{1-6}$ alkoxy group, and preferably a methyl group;
D represents a group selected from:
—CH$_2$O(CH$_2$)$_2$—,
—CH$_2$O(CH$_2$)$_3$—,
—CF$_2$O(CH$_2$)$_3$—,
—(CH$_2$)$_2$,
—(CH$_2$)$_3$—,
—(CH$_2$)$_4$—,
—CONH—(CH$_2$)$_3$—,
—CON(CH$_3$)—(CH$_2$)$_3$—,
—CON(Ph)-(CH$_2$)$_3$— (wherein Ph stands for phenyl) and
a group represented by the following formula:

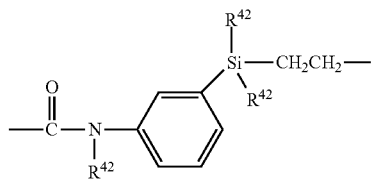

wherein R$^{42}$ each independently represents a hydrogen atom, a C$_{1-6}$ alkyl group or a C$_{1-6}$ alkoxy group, preferably a methyl group or a methoxy group, and more preferably a methyl group; and
E represents —(CH$_2$)$_n$— (n represents an integer of 2 to 6), provided that
D is bonded to PFPE as a molecular backbone, and E is bonded to an opposite group to PFPE.

Specific examples of $X^1$, $X^3$, $X^5$, $X^7$ and $X^9$ include, for example,
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—, —CH₂O(CH₂)₃Si(CH₃)₂O(Si(CH₃)₂O)₂₀Si(CH₃)₂(CH₂)₂—,
—CH₂OCF₂CHFOCF₂—,
—CH₂OCF₂CHFOCF₂CF₂—,
—CH₂OCF₂CHFOCF₂CF₂CF₂—,
—CH₂OCH₂CF₂CF₂OCF₂—,
—CH₂OCH₂CF₂CF₂OCF₂CF₂—,
—CH₂OCH₂CF₂CF₂OCF₂CF₂CF₂—,
—CH₂OCH₂CF₂CF₂OCF(CF₃)CF₂OCF₂—,
—CH₂OCH₂CF₂CF₂OCF(CF₃)CF₂OCF₂CF₂—,
—CH₂OCH₂CF₂CF₂OCF(CF₃)CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OCF₂CF₂CF₂—,
—CH₂OCH₂CHFCF₂OCF(CF₃)CF₂OCF₂—,
—CH₂OCH₂CHFCF₂OCF(CF₃)CF₂OCF₂CF₂—,
—CH₂OCH₂CHFCF₂OCF(CF₃)CF₂OCF₂CF₂CF₂—
—CH₂OCH₂ (CH₂)₇CH₂Si(OCH₃)₂OSi(OCH₃)₂(CH₂)₂Si(OCH₃)₂OSi(OCH₃)₂(CH₂)₂—,
—CH₂OCH₂CH₂CH₂Si(OCH₃)₂OSi(OCH₃)₂(CH₂)₃—,
—CH₂OCH₂CH₂CH₂Si(OCH₂CH₃)₂OSi(OCH₂CH₃)₂(CH₂)₃—,
—CH₂OCH₂CH₂CH₂Si(OCH₃)₂OSi(OCH₃)₂(CH₂)₂—,
—CH₂OCH₂CH₂CH₂Si(OCH₂CH₃)₂OSi(OCH₂CH₃)₂(CH₂)₂—,
—(CH₂)₂—,
—(CH₂)₃—,
—(CH₂)₄—,
—(CH₂)₅—,
—(CH₂)₆—,
—CONH—(CH₂)₃—,
—CON(CH₃)—(CH₂)₃—,
—CON(Ph)-(CH₂)₃— (wherein Ph stands for phenyl),
—CONH—(CH₂)₆—,
—CON(CH₃)—(CH₂)₆—,
—CON(Ph)-(CH₂)₆— (wherein Ph stands for phenyl),
—CONH—(CH₂)₂NH(CH₂)₃—,
—CONH—(CH₂)₆NH(CH₂)₃—,
—CH₂O—CONH— (CH₂)₃—,
—CH₂O—CONH—(CH₂)₆—,
—S—(CH₂)₃—,
(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂₀Si(CH₃)₂(CH₂)₂—
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂—(CH₂)₂—Si(CH₃)₂—(CH₂)₃—,
—CH₂—O—(CH₂)₃—Si(CH₃)₂—(CH₂)₂—Si(CH₃)₂—CH(CH₃)—CH₂—,
—OCH₂—,
—O(CH₂)₃—,
—OCFHCF₂—, and

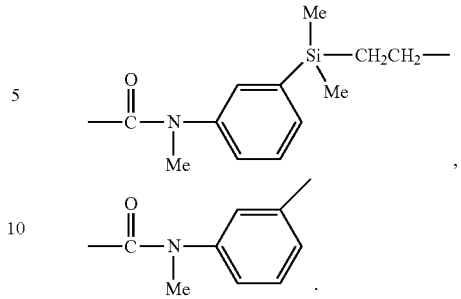

In another embodiment, $X^1$, $X^3$, $X^5$, $X^7$ and $X^9$ are each independently a group represented by the formula: —$(R^{16})_x$—$(CFR^{17})_y$—$(CH_2)_z$—. In the formula, x, y and z are each independently an integer of 0 to 10, the sum of x, y and z is 1 or more, and the occurrence order of the respective repeating units in parentheses is not limited in the formula.

In the above formula, $R^{16}$ is each independently at each occurrence an oxygen atom, phenylene, carbazolylene, —$NR^{26}$— (wherein $R^{26}$ represents a hydrogen atom or an organic group) or a divalent organic group. Preferably, $R^{16}$ is an oxygen atom or a divalent polar group.

Examples of the "divalent polar group" include, but are not limited to, —C(O)—, —C(=$NR^{27}$)— and —C(O)$NR^{27}$— (wherein $R^{27}$ represents a hydrogen atom or a lower alkyl group). The "lower alkyl group" is, for example, an alkyl group having 1 to 6 carbon atoms, such as methyl, ethyl and n-propyl which are optionally substituted with one or more fluorine atoms.

In the above formula, $R^{17}$ is each independently at each occurrence a hydrogen atom, a fluorine atom or a lower fluoroalkyl group, and preferably a fluorine atom. The "lower fluoroalkyl group" is, for example, a fluoroalkyl group having 1 to 6 carbon atoms, preferably 1 to 3 carbon atoms, preferably a perfluoroalkyl group having 1 to 3 carbon atoms, more preferably a trifluoromethyl group or pentafluoroethyl group, further preferably a trifluoromethyl group.

In another embodiment, examples of the groups represented by $X^1$, $X^3$, $X^5$, $X^7$ and $X^9$ include the following groups:

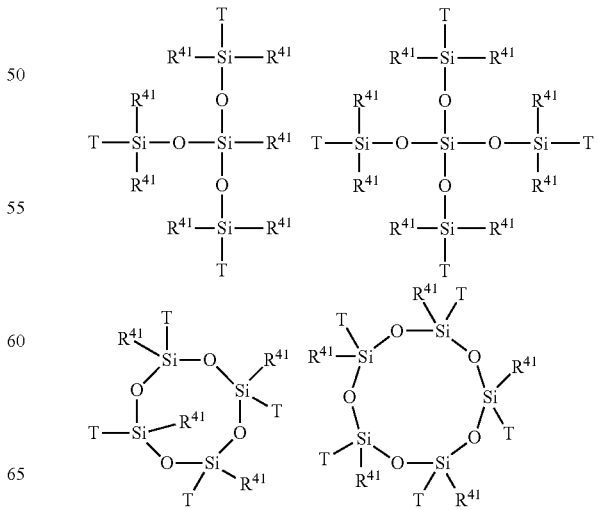

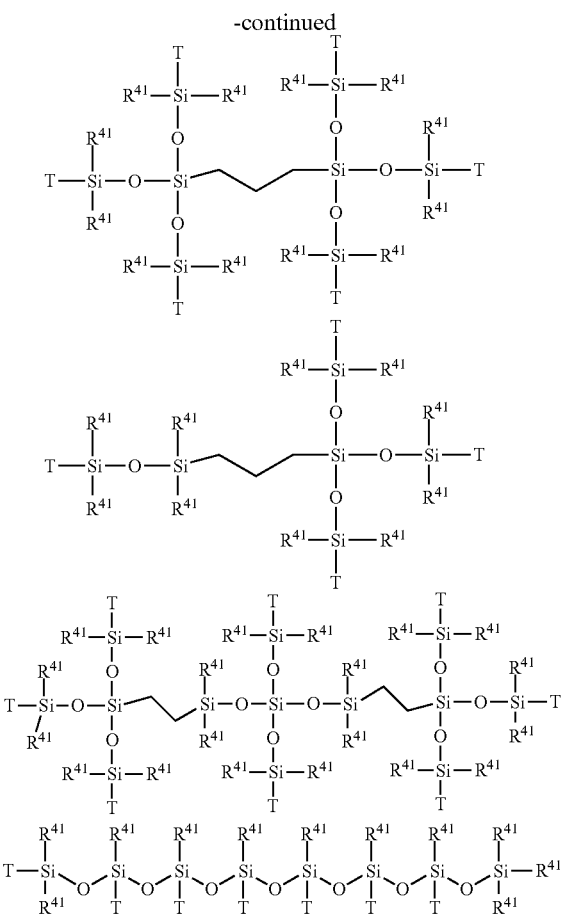

wherein:

R⁴¹ is each independently a hydrogen atom, a phenyl group, an alkyl group having 1 to 6 carbon atoms or a $C_{1-6}$ alkoxy group, preferably a methyl group;

in each group represented by $X^1$, some of the groups represented by T represent the following groups to be bound to PFPE of the molecular backbone:

—CH₂O(CH₂)₂—,
—CH₂O(CH₂)₃—,
—CF₂O(CH₂)₃—,
—(CH₂)₂—,
—(CH₂)₃—,
—(CH₂)₄—,
—CONH—(CH₂)₃—,
—CON(CH₃)—(CH₂)₃—,
—CON(Ph)-(CH₂)₃— (wherein Ph stands for phenyl) or a group represented by:

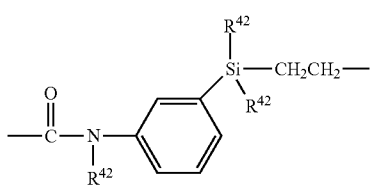

wherein each $R^{42}$ independently represents a hydrogen atom, a $C_{1-6}$ alkyl group or a $C_{1-6}$ alkoxy group, preferably a methyl group or a methoxy group, more preferably a methyl group, some of the other groups represented by T are —(CH₂)ₙ″— (n" is an integer of 2 to 6) attached to a group opposite to PFPE of the molecular backbone (that is, a carbon atom in formula (A1), (A2), (D1) and (D2), a Si atom in the following formulae (B1), (B2), (C1) and (C2), and A in the following formulae (E1) and (E2)); and the remaining groups represented by T, if present, are each independently a methyl group, a phenyl group, a $C_{1-6}$ alkoxy group, a radical scavenging group or a UV absorbing group.

The radical scavenging group is not limited as long as it can scavenge a radical generated by light irradiation, and examples include residues of benzophenones, benzotriazoles, benzoates, phenyl salicylates, crotonic acids, malonates, organoacrylates, hindered amines, hindered phenols, or triazines.

The UV absorbing group is not limited as long as it can absorb ultraviolet rays, and, for example, a residue of a benzotriazole, a hydroxybenzophenone, an ester of a substituted and unsubstituted benzoic acid or salicylic acid compound, an acrylate or an alkoxy cinnamate, an oxamide, an oxanilide, a benzoxazinone or a benzoxazole, is mentioned.

In a preferable embodiment, examples of a preferable radical scavenging group or UV absorbing group include:

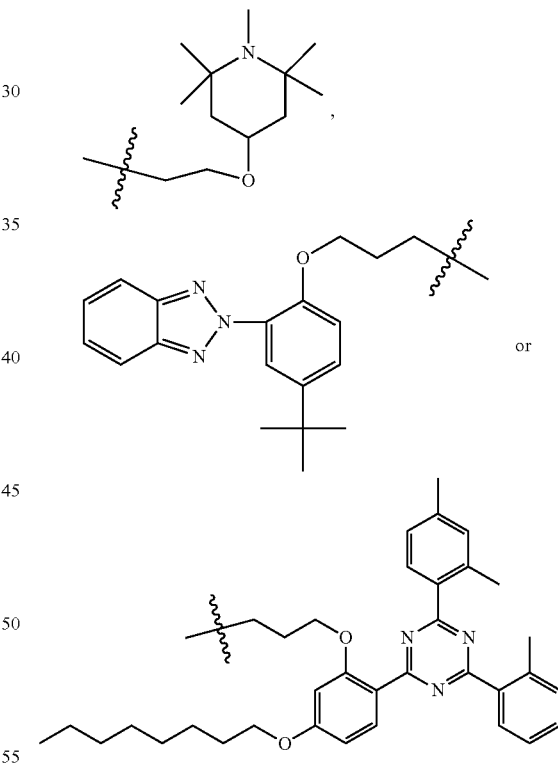

In this embodiment, $X^1$, $X^3$, $X^5$, $X^7$ and $X^9$ may be each independently a tri- to decavalent organic group.

In the composition, the compounds represented by formulae (A2), (B2), (C2), (D2) and (E2) (hereinafter, also referred to as "component (2)") are 0.1 mol % or more and 35 mol % or less based on the total of the compounds represented by formulae (A1), (B1), (C1), (D1) and (E1) (hereinafter, also referred to as "component (1)") and the compounds represented by formulae (A2), (B2), (C2), (D2) and (E2). The lower limit of the content of the compounds represented by formulae (A2), (B2), (C2), (D2) and (E2)

based on the total of the components (1) and (2) is preferably 0.1 mol %, more preferably 0.2 mol %, further preferably 0.5 mol %, even more preferably 1 mol %, particularly preferably 2 mol %, especially 5 mol %. The upper limit of the content of compounds represented by formulae (A2), (B2), (C2), (D2) and (E2) based on the total of components (1) and (2) is preferably 35 mol %, more preferably 30 mol %, even more preferably 20 mol %, yet more preferably 15 mol % or 10 mol %. The compounds represented by formulae (A2), (B2), (C2), (D2) and (E2) based on the total of the components (1) and (2) are preferably 0.1 mol % or more and 30 mol % or less, more preferably 0.1 mol % or more and 20 mol % or less, further preferably 0.2 mol % or more and 10 mol % or less, even more preferably 0.5 mol % or more and 10 mol % or less, particularly preferably 1 mol % or more and 10 mol % or less, such as 2 mol % or more and 10 mol % or less, or 5 mol % or more and 10 mol % or less. By setting the content of the component (2) to such a range, electrical characteristics can be improved.

In the composition, the combination of the component (1) and the component (2) is a combination of a compound represented by formula (A1) and a compound represented by formula (A2), a combination of a compound represented by formula (B1) and a compound represented by formula (B2), a combination of a compound represented by formula (C1) and a compound represented by formula (C2), a combination of a compound represented by formula (D1) and a compound represented by formula (D2), or a combination of a compound represented by formula (E1) and a compound represented by formula (E2).

The number average molecular weight of the perfluoropolyether group-containing silane compound to be used in the present disclosure is preferably 1,000 to 30,000, preferably 1,500 to 30,000, more preferably 2,000 to 10,000.

The polydispersity (weight average molecular weight/number average molecular weight (Mw/Mn)) of the perfluoropolyether group-containing silane compound to be used in the present disclosure, although it is not limited, may be preferably 1.0 or more and 3.0 or less, more preferably 1.0 or more and 2.0, further preferably 1.0 to 1.5. When the polydispersity is controlled to be 3.0 or less, the uniformity of a film can be more improved. A smaller polydispersity results in a greater uniformity of a film.

In the perfluoropolyether group-containing silane compound to be used in the present disclosure, the number average molecular weight of a perfluoropolyether moiety (Rf—PFPE-moiety or —PFPE-moiety), although it is not limited, is preferably 500 to 30,000, preferably 1,000 to 30,000, more preferably 1,500 to 10,000.

In a preferable embodiment, $\alpha$, $\alpha'$, $\beta$, $\beta'$, $\gamma$, $\gamma'$, $\delta$, $\delta'$, $\varepsilon$ and $\varepsilon'$ are 1.

In a preferable embodiment, the perfluoropolyether group-containing compound may be a compound represented by the following formula (A1), (A2), (B1), (B2), (C1), (C2), (D1) or (D2), a so-called perfluoropolyether group-containing silane compound. When such a silane compound is used, cycle characteristics can be more improved. In addition, adhesion of a film formed of the perfluoropolyether group-containing silane compound to an electrode can be improved.

In a more preferable embodiment, the perfluoropolyether group-containing compound may be a compound represented by the following formula (A1), (A2), (C1), (C2), (D1) or (D2), a so-called perfluoropolyether group-containing silane compound. When such a silane compound is used, cycle characteristics can be more improved. In addition, adhesion of a film formed of the perfluoropolyether group-containing silane compound to an electrode can be improved.

In another preferable embodiment, the perfluoropolyether group-containing compound has two or more, preferably three or more, Si atoms having a hydroxyl group or a hydrolyzable group at one end or both ends.

In the perfluoropolyether group-containing compound represented by formula (A1) or formula (A2), t is preferably 2 or more, more preferably an integer of 2 to 10, further preferably an integer of 2 to 6.

In the perfluoropolyether group-containing compound represented by formula (C1) or formula (C2), k is preferably 2 or 3, more preferably 3.

In a preferable embodiment, the perfluoropolyether group-containing compound represented by formula (C1) or formula (C2) has an —Si—(Z—SiR$^{72}$$_3$)$_2$ or —Si—(Z—SiR$^{72}$$_3$)$_3$ structure at an end.

In the perfluoropolyether group-containing compound represented by formula (D1) or formula (D2), l' is preferably 2 or 3, more preferably 3.

In a preferable embodiment, the perfluoropolyether group-containing compound represented by formula (D1) or formula (D2) has a —C—(Y—SiR$^{85}$$_3$)$_2$ or —Si—(Y—SiR$^{85}$$_3$)$_3$ structure at an end.

In one embodiment, the perfluoropolyether group-containing compound is a compound represented by formula (A1) or (A2).

In one embodiment, the perfluoropolyether group-containing compound is a compound represented by formula (B1) or (B2).

In one embodiment, the perfluoropolyether group-containing compound is a compound represented by formula (C1) or (C2).

In one embodiment, the perfluoropolyether group-containing compound is a compound represented by formula (D1) or (D2).

In one embodiment, the perfluoropolyether group-containing compound is a compound represented by formula (E1) or (E1).

Compounds represented by formulae (A1), (A2), (B1), (B2), (C1), (C2), (D1), (D2), (E1) and (E2) may be produced by methods known in the art.

The above composition may contain another component in addition to the compound represented by formula (A1), (A2), (B1), (B2), (C1), (C2), (D1), (D2), (E1) or (E2). Such other components are not limited, and examples thereof include a (unreactive) fluoropolyether compound which can be understood as a fluorine-containing oil, preferably a perfluoro(poly)ether compound (hereinafter, referred to as "fluorine-containing oil"), a (unreactive) silicone compound which can be understood as a silicone oil (hereinafter, referred to as "silicone oil"), and a catalyst.

Further examples of other components include alcohol, transition metal, halide ion, and compound containing an atom having an unshared electron pair within a molecular structure.

In a preferable embodiment, other components include a fluorine-containing oil.

The fluorine-containing oil is not limited, and examples thereof include a compound (perfluoro(poly)ether compound) represented by the following general formula (3):

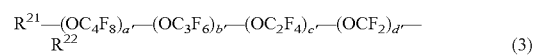

wherein R$^{21}$ represents a C$_{1-16}$ alkyl group optionally substituted with one or more fluorine atoms (preferably, $C_{1-16}$ perfluoroalkyl group), $R^{22}$ represents a $C_{1-16}$ alkyl group optionally substituted with one or more fluorine atoms (preferably, $C_{1-16}$ perfluoroalkyl group), a fluorine atom, or a hydrogen atom, and $R^{21}$ and $R^{22}$ are each independently, more preferably, a $C_{1-3}$ perfluoroalkyl group; and a', b', c' and d' represent the respective numbers of four repeating units in perfluoro(poly)ether constituting a main backbone of the polymer and are independently of one another an integer of 0 or more and 300 or less, the sum of a', b', c' and d' is at least 1, preferably 1 to 300, more preferably 20 to 300, the occurrence order of the respective repeating units in parentheses with the subscript a', b', c' or d' is not limited in the formula, and, among such repeating units, —($OC_4F_8$)— may be any of —($OCF_2CF_2CF_2CF_2$)—, —($OCF(CF_3)CF_2CF_2$)—, —($OCF_2CF(CF_3)CF_2$)—, —($OCF_2CF_2CF(CF_3)$)—, —($OC(CF_3)_2CF_2$)—, —($OCF_2C(CF_3)_2$)—, —($OCF(CF_3)CF(CF_3)$)—, —($OCF(C_2F_5)CF_2$)— and —($OCF_2CF(C_2F_5)$)— and is preferably —($OCF_2CF_2CF_2CF_2$)—, —($OC_3F_6$)— may be any of —($OCF_2CF_2CF_2$)—, —($OCF(CF_3)CF_2$)— and —($OCF_2CF(CF_3)$)— and is preferably —($OCF_2CF_2CF_2$)—, and —($OC_2F_4$)— may be any of —($OCF_2CF_2$)— and —($OCF(CF_3)$)— and is preferably —($OCF_2CF_2$)—.

Examples of the perfluoro(poly)ether compound represented by general formula (3) include a compound represented by any of the following general formulae (3a) and (3b) (which may be single compound or a mixture of two or more compounds).

$R^{21}$—($OCF_2CF_2CF_2$)$_{b''}$—$R^{22}$ (3a)

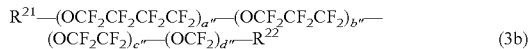

$R^{21}$—($OCF_2CF_2CF_2CF_2$)$_{a''}$—($OCF_2CF_2CF_2$)$_{b''}$— ($OCF_2CF_2$)$_{c''}$—($OCF_2$)$_{d''}$—$R^{22}$ (3b)

In these formulae, $R^{21}$ and $R^{22}$ are as described above; in formula (3a), b'' is an integer of 1 or more and 100 or less; and, in formula (3b), a'' and b'' are each independently an integer of 0 or more and 30 or less, c'' and d'' are each independently an integer of 1 or more and 300 or less, and the occurrence order of the respective repeating units in parentheses with subscript a'', b'', c'', d'' is not limited in the formulae.

In one embodiment, the compound represented by formula (3b) is one or more compounds represented by formula (3b) wherein the ratio of c'' to d'' (c''/d'' ratio) is 0.2 or more and 2 or less.

The fluorine-containing oil may have an average molecular weight of 1,000 to 30,000.

In the composition, the compound represented by formula (3) is contained in an amount of 0.1 mol % or more and 50 mol % or less, more preferably 1 mol % or more and 40 mol % or less, even more preferably 5 mol % or more and 30 mol % or less, based on the total of the compounds represented by formulae (A1), (B1), (C1), (D1) and (E1), the compounds represented by formulae (A2), (B2), (C2), (D2) and (E2), and the compound represented by formula (3).

The composition of the present invention can include, for example, 0 to 300 parts by mass, preferably 50 to 200 parts by mass of such silicone oil based on 100 parts by mass in total of the PFPE-containing silane compound of the present invention (in the case of two or more kinds, the total thereof, the same also applies below).

Examples of the catalyst include an acid (for example, acetic acid, trifluoroacetic acid, or the like), a base (for example, ammonia, triethylamine, diethylamine, or the like) and a transition metal (for example, Ti, Ni, Sn, or the like).

The catalyst promotes hydrolysis and dehydration condensation of the PFPE-containing silane compound of the present invention, and promotes formation of a coating layer.

Examples of the transition metal include platinum, ruthenium and rhodium.

Examples of the halide ion include a chloride ion.

The compound containing an atom having an unshared electron pair within the molecular structure preferably contains at least one atom selected from the group consisting of a nitrogen atom, an oxygen atom, a phosphorus atom and a sulfur atom, and more preferably contains a sulfur atom or a nitrogen atom.

The compound containing an atom having an unshared electron pair within the molecular structure preferably contains at least one functional group selected from the group consisting of an amino group, an amide group, a sulfinyl group, a P=O group, an S=O group and a sulfonyl group within the molecular structure, and more preferably contains at least one functional group selected from the group consisting of a P=O group and an S=O group.

The compound containing an atom having an unshared electron pair within the molecular structure is preferably at least one compound selected from the group consisting of aliphatic amine compounds, aromatic amine compounds, phosphoric acid amide compounds, amide compounds, urea compounds and sulfoxide compounds, is more preferably at least one compound selected from the group consisting of aliphatic amine compounds, aromatic amines, phosphoric acid amides, urea compounds and sulfoxide compounds, is particularly preferably at least one compound selected from the group consisting of sulfoxide compounds, aliphatic amine compounds and aromatic amine compounds, and is even more preferably a sulfoxide compound.

Examples of the aliphatic amine compounds include diethylamine and triethylamine. Examples of the aromatic amine compounds include aniline and pyridine. Examples of the phosphoric acid amide compounds include hexamethylphosphoramide. Examples of the amide compounds include N,N-diethylacetamide, N,N-diethylformamide, N,N-dimethylacetamide, N-methylformamide, N,N-dimethylformamide, and N-methylpyrrolidone. Examples of the urea compounds include tetramethylurea. Examples of the sulfoxide compounds include dimethyl sulfoxide (DMSO), tetramethylene sulfoxide, methylphenyl sulfoxide, and diphenyl sulfoxide. Among such compounds, dimethyl sulfoxide or tetramethylene sulfoxide is preferably used.

Examples of such other component include, not only the above, but also tetraethoxysilane, methyltrimethoxysilane, 3-aminopropyltrimethoxysilane, 3-glycidoxypropyltrimethoxysilane, and methyltriacetoxysilane.

Examples of other components include, not only the above, but also alcohol compounds having 1 to 6 carbon atoms.

As a method for forming a coating layer of a perfluoropolyether group-containing compound on the surface of an electrode, for example, there is a method of forming a coating layer by forming a film of a perfluoropolyether group-containing compound on an electrode material, and optionally subjecting the film to a post-treatment.

The method for forming a a coating layer of a perfluoropolyether group-containing compound on the an electrode material can be performed by applying a perfluoropolyether group-containing compound to the surface of the electrode material so as to cover the surface. The coating method is not limited. For example, a wet coating method and a dry coating method can be used.

The perfluoropolyether group-containing compound may be directly applied or applied as a composition prepared by mixing it with other components such as a solvent.

Examples of the solvent to be used in the composition include a $C_{5-12}$ perfluoroaliphatic hydrocarbon (for example, perfluorohexane, perfluoromethylcyclohexane and perfluoro-1,3-dimethylcyclohexane); a polyfluoroaromatic hydrocarbon (for example, bis(trifluoromethyl)benzene); a polyfluoroaliphatic hydrocarbon (for example, $C_6F_{13}CH_2CH_3$ (for example, ASAHI KLIN (registered trade mark) AC-6000, manufactured by Asahi Glass Co., Ltd., and 1,1,2,2,3,3,4-heptafluorocyclopentane (for example, ZEORORA-H (registered trade mark) manufactured by ZEON CORPORATION)); a hydrofluorocarbon (RFC) (for example, 1,1,1,3,3-pentafluorobutane (HFC-365mfc)); a hydrochlorofluorocarbon (for example, HCFC-225 (ASAHI KLIN (registered trade mark) AK225)); and a hydrofluoroether (HFE) (for example, an alkyl perfluoroalkylether (a perfluoroalkyl group and an alkyl group may be linear or branched) such as perfluoropropyl methyl ether ($C_3F_7OCH_3$) (for example, Novec (trade name) 7000, manufactured by SUMITOMO 3M), perfluorobutyl methyl ether ($C_4F_9OCH_3$) (for example, Novec (trade name) 7100, manufactured by SUMITOMO 3M), perfluorobutyl ethyl ether ($C_4F_9OC_2H_5$) (for example, Novec (trade name) 7200, manufactured by SUMITOMO 3M), perfluorohexyl methyl ether ($C_2F_5CF(OCH_3)C_3F_7$) (for example, Novec (trade name) 7300 manufactured by SUMITOMO 3M) or $CF_3CH_2OCF_2CHF_2$ (for example, ASAHI KLIN (registered trade mark) AE-3000, manufactured by Asahi Glass Co., Ltd.), 1,2-dichloro-1,3,3,3-tetrafluoro-1-propene (for example, Vertrel (registered trade mark) Sion, manufactured by Du Pont-Mitsui Fluorochemicals Co., Ltd.). These solvents may be used alone or as a mixture prepared by mixing two or more solvents in combination. To adjust, e.g., solubility of a perfluoropolyether group-containing silane compound, these solvents may be mixed with another solvent.

The composition may contain other components. Examples of the components include, but are not limited to, a catalyst.

Examples of the catalyst include an acid (for example, acetic acid, trifluoroacetic acid, or the like), a base (for example, ammonia, triethylamine, diethylamine, or the like) and a transition metal (for example, Ti, Ni, Sn, or the like).

The catalyst promotes hydrolysis and dehydration condensation of a perfluoropolyether group-containing silane compound to accelerate formation of the coating layer.

Examples of the wet coating method include dip coating, spin coating, flow coating, spray coating, roll coating, gravure coating and an analogous method.

Examples of the dry coating method include a PVD method, a CVD method and an analogous method. The PVD method refers to a method of forming a thin film by heating a solid raw material in vacuum (vacuum deposition) or irradiating a solid raw material with high speed electrons and ions, thereby applying physical energy to atoms present on a solid surface to vaporize the atoms, which are allowed to recouple on an electrode material. Examples of the PVD method include, but are not limited to, a deposition method (usually, vacuum deposition method) and sputtering. Specific examples of the deposition method (usually, vacuum deposition method) include resistive heating, high-frequency heating using electron beam, microwave or the like, ion beam, and similar methods. Specific examples of the CVD method include plasma-CVD, optical CVD, thermal CVD, and similar methods. In particular, a PVD method is preferable, particularly a deposition method, for example resistance heating deposition or electron beam deposition, is preferable, and electron beam deposition is more preferable.

Coating may be carried out also by an atmospheric pressure plasma method.

Subsequently, the film is optionally subjected to post treatment. The post treatment, although it is not limited, may be e.g., heating, moisture supply or both of them.

The post treatment may be carried out for improving durability of the coating layer (thus, improving the cycle characteristics or storage stability of a lithium ion secondary battery); however, it should be noted that post treatment is not an essential step. For example, the film after the reactive perfluoropolyether group-containing compound is applied thereto may be just allowed to stand still.

In the manner as mentioned above, a coating layer, i.e., a film of the perfluoropolyether group-containing compound, is formed on the electrode material.

The electrode of the present disclosure may be obtained by treating a surface of an electrode material with a perfluoropolyether group-containing compound; or the electrode may be formed from a mixture of a raw material for forming an electrode material and a perfluoropolyether group-containing compound.

The thickness of the coating layer, although it is not limited, preferably falls within the range of 0.1 to 50 nm, preferably 0.3 to 50 nm, more preferably 0.5 to 30 nm, further preferably 1 to 10 nm. By making the thickness larger, contact between an electrode material and the electrolyte can be more effectively inhibited, with the result that the function or electrical characteristics of an electrochemical device can be improved. In contrast, by making the thickness smaller, the distance between an active material and the electrolyte can be reduced, with the result that capacity can be increased.

In a preferable embodiment, the coating layer is a monomolecular film. When the coating layer is a monomolecular film, a thinner and denser film can be obtained, with the result that not only improvement of electrical characteristics but also increase of capacity can be attained at a higher level.

By the electrode of the present disclosure having a compound having a perfluoropolyether group, the electrode is used in an electrochemical device, the cycle capacity retention rate of the electrochemical device is improved and the resistance increase rate thereof can be suppressed, and further, deterioration in performance during storage at a high temperature can be suppressed. Also, precipitation of a transition metal on a negative electrode can be suppressed. Although the present disclosure is not bound by any theory, the reason why the aforementioned effect can be obtained is considered that direct contact between an electrode material and an electrolytic solution can be suppressed by a compound having a perfluoropolyether group contained in the electrode of the present disclosure.

Electrode Material

The electrode material refers to a member constituting a main part of an electrode of an electrochemical device and ordinarily used in various electrochemical devices. The electrode material may be appropriately selected by those skilled in the art in accordance with the type of electrochemical device. For example, in an alkali metal ion battery, the electrode material may be an active material-containing portion containing an active material (hereinafter, used for collectively referring to a positive electrode active material and a negative electrode active material). In an electric double-layer capacitor, the electrode material may be a portion forming an electric-double layer at the interface in contact with an electrolyte, for example, a portion containing carbon or graphite.

The electrode of the present invention may be used as either one of a positive electrode and a negative electrode in an electrochemical device. If the electrode of the present invention is used as the positive electrode, oxidative decomposition of an electrolytic solution can be suppressed, with the result that deterioration of the electrochemical device (battery) and decomposition of the structure of the positive electrode due to decomposition of the electrolytic solution can be suppressed. If the electrode of the present invention is used as the negative electrode, a solid/electrolyte interface (SEI) structure, which is formed at the interface between the electrode and the electrolytic solution, can be stabilized to allow lithium ions to satisfactorily move. As a result, an increase of resistance can be suppressed.

Since the electrode of the present disclosure contains a perfluoropolyether group-containing compound in the surface thereof, as mentioned above, when the electrode is used as a positive electrode and/or a negative electrode in an electrochemical device, satisfactory electrical characteristics and large capacity of the electrochemical device can be achieved.

<Electrochemical Device>

As mentioned above, the electrode of the present disclosure can be used in various electrochemical devices.

Accordingly, the present disclosure also provides electrochemical devices having the electrode of the present disclosure.

The electrochemical device refers to a device having at least a pair of electrodes and an electrolyte intervening between the pair of electrodes.

Examples of the electrochemical device include, but are not limited to, a battery, an electrochemical sensor, an electrochromic device, an electrochemical switching device, an electrolytic capacitor and an electrochemical capacitor.

The battery is not limited as long as it has electrodes and an electrolyte. Examples thereof include an alkali metal battery, an alkali metal ion battery, an alkaline earth metal ion battery, a radical battery, a solar cell and a fuel cell. In a preferable embodiment, as specific examples of the battery, an alkali metal battery, an alkali metal ion battery or an alkaline earth metal battery such as a lithium battery, a lithium ion battery, a sodium ion battery, a magnesium battery, a lithium air battery, a sodium-sulfur battery and a lithium-sulfur battery can be mentioned, and preferably a lithium ion battery can be mentioned. The battery may be a primary battery and a secondary battery, preferably an alkali metal ion secondary battery, and particularly, a lithium ion secondary battery.

The electrochemical sensor refers to a sensor, which is used for detecting or determining natural phenomena or mechanical, electromagnetic, thermal, acoustical and chemical properties of an artifact, or spatial information/timing information indicated by them, and which has an electrode(s) using an electrochemical principle and an electrolyte. Examples of the electrochemical sensor include an actuator, a humidity sensor, a gas-concentration sensor, an ion-concentration sensor and an odor sensor.

The electrochromic device refers to a device, which controls optical absorption in a reversible manner by application of voltage (or current), and which has an electrode(s) using an electrochemical reaction and an electrolyte. Examples of the electrochromic device include an electrochromic device electrically changing color.

The electrochemical switching device is not limited as long as it has an electrode(s) and an electrolyte. Examples thereof include an electrochemical transistor and a field effect transistor.

The electrolytic capacitor is not limited as long as it has an electrode (s) and an electrolyte. Examples thereof include an aluminum electrolytic capacitor and a tantalum electrolytic capacitor.

The electrochemical capacitor is not limited as long as it has an electrode(s) and an electrolyte. Examples thereof include an electric double layer capacitor, a redox capacitor and a hybrid capacitor such as a lithium ion capacitor.

In one embodiment, the electrochemical device of the present disclosure can be a device using the electrode of the present disclosure only as one of the electrodes. For example, the electrochemical device of the present disclosure can employ the electrode of the present disclosure only as a negative electrode or a positive electrode. In one embodiment, the electrochemical device of the present disclosure can employ the electrode of the present disclosure only as a positive electrode. In another embodiment, the electrochemical device of the present disclosure can employ the electrode of the present disclosure as both electrodes, i.e., a positive electrode and a negative electrode.

The electrochemical device of the present disclosure is not limited to the examples mentioned above as long as it is a device consisting of at least a pair of electrodes and an electrolyte intervening between the pair of electrodes. Also, the electrochemical device of the present disclosure is satisfactory if the electrode of the present disclosure is used as at least one of the electrodes and other constituents may be the same as in a conventional electrochemical device unless otherwise specified.

<Alkali Metal Ion Secondary Battery>

Now, the electrochemical device of the present disclosure will be more specifically described by way of an alkali metal ion secondary battery as an example.

In one embodiment, the present disclosure provides an alkali metal ion secondary battery having the electrode of the present disclosure as at least one of the positive electrode and negative electrode and preferably a lithium ion secondary battery.

The alkali metal ion secondary battery of the present disclosure possibly has a general structure as an alkali metal ion secondary battery. For example, the alkali metal ion secondary battery of the present disclosure possibly has, e.g., a positive electrode, a negative electrode, a separator and an electrolytic solution in an exterior case. Also, the alkali metal ion secondary battery of the present disclosure further possibly has members except those mentioned above such as a positive electrode current collector tab, a negative electrode current collector tab and a battery cover, or a member for protecting the battery, such as an internal pressure release valve or a PTC element.

In the alkali metal ion secondary battery, an electrode material may be an active material-containing portion containing an active material (hereinafter, used for collectively referring to a positive electrode active material and a negative electrode active material). Typically, an electrode material may be constituted of an active material-containing portion and a current collector. In one embodiment, the active material-containing portion is present on the current collector in the form of a laminate.

Positive Electrode

The positive electrode has a positive electrode material containing an active material-containing portion containing a positive electrode active material. When the positive electrode is the electrode of the present disclosure, the positive electrode further has a perfluoropolyether group-containing compound on a surface of the positive electrode material.

The positive electrode active material is not limited as long as it can electrochemically absorb/desorb an alkali metal ion; preferably, for example, a substance containing an alkali metal and at least one transition metal. Specific examples thereof include an alkali metal-containing transition metal composite oxide and an alkali metal-containing transition metal phosphate compound. Of them, an alkali metal-containing transition metal composite oxide generating high voltage is particularly preferable as the positive electrode active material. Examples of the alkali metal ion include a lithium ion, a sodium ion and a potassium ion. In a preferable embodiment, the alkali metal ion may be a lithium ion. That is, in this embodiment, the alkali metal ion secondary battery refers to a lithium ion secondary battery.

Examples of the alkali metal-containing transition metal composite oxide include a lithium-manganese spinel composite oxide represented by formula:

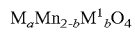

$$M_aMn_{2-b}M^1{}_bO_4$$

wherein M is at least one metal selected from Li, Na and K; $0.9 \leq a$; $0 \leq b \leq 1.5$; $M^1$ is at least one metal selected from the group consisting of Fe, Co, Ni, Cu, Zn, Al, Sn, Cr, V, Ti, Mg, Ca, Sr, B, Ga, In, Si and Ge;

a lithium-nickel composite oxide represented by formula:

$$MNi_{1-c}M^2{}_cO_2$$

wherein M is at least one metal selected from Li, Na and K; $0 \leq c \leq 0.5$; $M^2$ is at least one metal selected from the group consisting of Fe, Co, Mn, Cu, Zn, Al, Sn, Cr, V, Ti, Mg, Ca, Sr, B, Ga, In, Si and Ge; and, a lithium-cobalt composite oxide represented by formula:

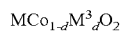

$$MCo_{1-d}M^3{}_dO_2$$

wherein M is at least one metal selected from Li, Na and K; $0 \leq d \leq 0.5$; $M^3$ is at least one metal selected from the group consisting of Fe, Ni, Mn, Cu, Zn, Al, Sn, Cr, V, Ti, Mg, Ca, Sr, B, Ga, In, Si and Ge.

In the above, M is preferably at least one metal selected from Li, Na and K, more preferably Li or Na, further preferably Li.

Among them, for the reason that an alkali metal ion secondary battery having a high energy density and a high power can be provided, $MCoO_2$, $MMnC_k$, $MNiCh$, $MMn_2O_4$, $MNi_{0.8}Co_{0.15}Al_{0.05}O_2$ or $MNi_{1/3}Co_{1/3}Mn_{1/3}O_2$ is preferable.

Examples of other positive electrode active materials include $MFePO_4$, $MNi_{0.8}Co_{0.2}O_2$, $M_{1.2}Fe_{0.4}Mn_{0.4}O_2$, $MNi_{0.5}Mn_{1.5}O_2$, $MV_3O_6$ and $M_2MnO_3$. Particularly, a positive electrode active material such as $M_2MnO_3$ and $MNi_{0.5}Mn_{1.5}O_2$ is preferable because even if the lithium ion secondary battery using such a positive electrode active material is operated at a voltage beyond 4.4 V, e.g., a voltage of, 4.6 V or more, its crystal structure is not broken. Accordingly, an electrochemical device, such as a lithium ion secondary battery, having the positive electrode of the present disclosure using a positive electrode material containing a positive electrode active material as mentioned above, is preferable because even if it is stored at a high temperature, the residual capacity of the secondary battery rarely decreases and the resistance increase rate rarely changes, and even if it is operated at a high voltage, the battery performance rarely deteriorates.

Negative Electrode

The negative electrode has a negative electrode material containing an active material-containing portion containing a negative electrode active material. When the negative electrode is the electrode of the present disclosure, the negative electrode further has a perfluoropolyether group-containing compound on a surface of the negative electrode material.

Examples of the negative electrode active material that can be mentioned include thermolysis products of an organic substance in various thermal decomposition conditions, carbonaceous materials that can absorb/desorb alkali metals, preferably lithium, such as artificial graphite and natural graphite, metal oxide materials that can absorb/desorb an alkali metal, such as stannum oxide and silicon oxide; alkali metals; alkali metal alloys; and alkali metal-containing metal composite oxide materials. These negative electrode active materials may be used as a mixture of two or more.

As the carbonaceous material that can absorb/desorb an alkali metal, artificial graphite or purified natural graphite produced by treating graphitizable pitch, which can be obtained from various materials, at a high temperature, or a material obtained by treating the surface of graphite with pitch or an organic substance except the pitch, followed by carbonizing it, is preferable; and a material selected from carbonaceous materials obtained by subjecting natural graphite, artificial graphite, an artificial carbonaceous material and an artificial graphite substance once or more to a heat treatment performed in the range of 400 to 3200° C.; a carbonaceous material where a negative electrode active material layer is constituted of carbonaceous substances having at least two types or more different crystallinities and/or having an interface at which the different crystallinity carbonaceous substances are in contact with each other; and a carbonaceous material where a negative electrode active material layer has an interface at which at least two types of carbonaceous substances different in orientation are in contact with each other, is more preferable because the initial irreversible capacity, high current density charge and discharge characteristics are well balanced. These carbonaceous materials may be used alone or in any combination of two or more used in any combination of two or more at any ratio.

Examples of the carbonaceous material obtained by subjecting an artificial carbonaceous material and an artificial graphite material, once or more, to a heat treatment performed in the range of 400 to 3200° C. include coal-based coke, petroleum coke, coal pitch, petroleum-based pitch, and products obtained by oxidation treatment of these; needle coke, pitch coke and carbon agents obtained by partial graphitization of these; furnace black, acetylene black, a thermolysis product of an organic substance such as a pitch-based carbon fiber; organic substances that can be carbonized and carbides of these or solutions of the organic substances that can be carbonized dissolved in low molecular weight organic solvents such as benzene, toluene, xylene, quinoline and n-hexane, and carbides of these.

As the metal material to be used as the negative electrode active material, a single alkali metal, a single metal or an alloy forming an alkali metal alloy or oxides, carbides, nitrides, silicides, sulfides or phosphides of these may be mentioned, as long as it can absorb/desorb an alkali metal. As the single metal or alloy forming an alkali metal alloy, a material containing a metal/metalloid element belonging to the 13th and 14th families is preferable, and a single metal such as aluminum, silicon and stannum (hereinafter, simply referred to as "predetermined metal elements") and alloys or compounds containing these atomic elements are more preferable. These may be used alone or in any combination of two or more at any ratio.

Examples of a negative electrode active material having at least one atomic element selected from the predetermined metal elements include a single metal of any one of the predetermined metal elements; an alloy formed of two types or more predetermined metal elements; an alloy formed of a single or two types or more predetermined metal elements and a single or two types or more metal elements except the predetermined metal elements; a compound containing a single or two types or more predetermined metal elements; and composite compounds such as an oxide, a carbide, a nitride, a silicide, a sulfide or a phosphide of the compound. When a single metal, an alloy or a metal compound as mentioned above is used as the negative electrode active material, the capacity of the resultant battery can be increased.

In addition, compounds obtained by complexly binding these composite compounds to several elements such as single metals, an alloy or nonmetal elements, are mentioned; more specifically, when silicon and stannum are used, alloys of these elements with a metal not serving as a negative electrode, can be used. For example, in the case of using stannum, a complicated compound containing 5 to 6 elements, more specifically, containing a metal serving as a negative electrode except stannum and silicon, a metal not serving as a negative electrode, and non-metal elements in combination, can be used.

More specifically, Si, $SiB_4$, $SiB_4$, $Mg_2Si$, $Ni_2Si$, $TiSi_2$, $MoSi_2$, $CoSi_2$, $NiSi_2$, $CaSi_2$, $CrSi_2$, $Cu_6Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$, ($0<v\leq2$), LiSiO or stannum, $SnSiO_3$, LiSnO, $Mg_2Sn$ and $SnO_w$ ($0<w\leq2$) is mentioned.

A composite material containing Si or Sn as a first constituent element and further containing second and third constituent elements is mentioned. The second constituent element is at least one element of, e.g., cobalt, iron, magnesium, titanium, vanadium, chromium, manganese, nickel, copper, zinc, gallium and zirconium. The third constituent element is at least one element of, e.g., boron, carbon, aluminum and phosphorus.

In particular, for the reason that high battery capacity and excellent battery characteristics can be obtained, a single silicon or stannum (trace amounts of impurities may be contained), $SiO_v$ ($0<v\leq2$), $SnO_w$ ($0\leq w\leq2$), a Si—Co—C composite material, a Si—Ni—C composite material, a Sn—Co—C composite material and a Sn—Ni—C composite material are preferable as the metal material.

The alkali metal-containing metal composite oxide material to be used as the negative electrode active material is not limited as long as it can absorb/desorb an alkali metal. In consideration of high current density charge and discharge characteristics, a material containing titanium and an alkali metal is preferable; an alkali metal-containing composite metal oxide material containing titanium is more preferable; and a composite oxide containing an alkali metal and titanium (hereinafter simply referred to as "alkali metal/titanium composite oxide") is further preferable. In short, it is particularly preferable that an alkali metal titanium composite oxide having a spinel structure is added to a negative electrode active material for a battery using an electrolytic solution, because output resistance is greatly reduced.

The alkali metal titanium composite oxide is preferably a compound represented by formula:

wherein M is at least one metal selected from Li, Na and K; and $M^3$ represents at least one element selected from the group consisting of Na, K, Co, Al, Fe, Ti, Mg, Cr, Ga, Cu, Zn and Nb.

In the above, M is preferably at least one metal selected from Li, Na and K, more preferably Li or Na, further preferably Li.

Of the compounds mentioned above, a compound satisfying the following compositional features:
(i) $1.2\leq x\leq1.4$, $1.5\leq y\leq1.7$, $z=0$
(ii) $0.9\leq x\leq1.1$, $1.9\leq y\leq2.1$, $z=0$, and/or
(iii) $0.7\leq x\leq0.9$, $2.1\leq y\leq2.3$, $z=0$
is particularly preferable because well-balanced battery performance is obtained.

A particularly preferable composition of the above compound satisfying condition (i) is $M_{4/3}Ti_{5/3}O_4$; the composition satisfying condition (ii) is $M_1Ti_2O_4$; and the composition satisfying condition (iii) is $M_{4/5}Ti_{11/5}O_4$. As for a structure wherein $Z\neq0$, for example, $M_{4/3}Ti_{4/3}Al_{1/3}O_4$ is preferable.

An active material-containing portion containing a negative electrode active material as mentioned above is preferably formed of a negative-electrode mixture containing the negative electrode active material and can be obtained, for example, by applying the negative-electrode mixture onto a current collector followed by drying it.

It is preferable that the negative-electrode mixture further contains a binder, a thickener and a conductive material.

The Electrode of the Present Disclosure in Alkali Metal Ion Secondary Battery

In the alkali metal ion secondary battery, the electrode of the present disclosure is used as at least one of the electrodes.

When the electrode of the present disclosure is used as the positive electrode, oxidative decomposition of the electrolytic solution can be suppressed, with the result that deterioration of the battery and decomposition of a positive electrode structure caused by decomposition of the electrolytic solution can be suppressed. When the electrode of the present disclosure is used as the negative electrode, a solid electrolyte interface (SEI) structure formed at the interface between the electrode and the electrolytic solution, can be stabilized, attaining satisfactory movement of lithium ions, thereby suppressing an increase of resistance.

The electrode of the present disclosure used in an alkali metal ion secondary battery has a perfluoropolyether group-containing compound preferably on an electrode material, and more specifically, on an active material-containing portion.

In one embodiment of the alkali metal ion secondary battery of the present disclosure, the electrode of the present disclosure is used only as the positive electrode. When the electrode of the present disclosure is used only as the positive electrode, oxidative decomposition of the electrolytic solution can be suppressed, and deterioration of the battery and decomposition of a positive electrode structure can be suppressed. The effect is further exerted in a battery to be operated at a higher voltage.

In another embodiment of the alkali metal ion secondary battery of the present disclosure, the electrode of the present disclosure is used only as the negative electrode. When the electrode of the present disclosure is used only as the negative electrode, a SEI structure formed at the interface between the electrode and the electrolytic solution can be stabilized, with the result that reductive decomposition of the electrolytic solution can be suppressed up to a certain level and an increase of resistance of an SEI film can be suppressed.

In yet another embodiment of the alkali metal ion secondary battery of the present disclosure, the electrode of the present disclosure is used as both the positive electrode and the negative electrode. When the electrode of the present disclosure is used as both the positive electrode and negative electrode, oxidative decomposition of the electrolytic solution can be suppressed and further a solid electrolyte interface (SEI) structure formed at the interface between the electrode and the electrolytic solution can be stabilized.

When the electrode of the present disclosure is used as the positive electrode, in other words, when a perfluoropolyether group-containing compound is present in the positive electrode, oxidative decomposition of the electrolytic solution is suppressed particularly during a high-voltage operation time and deterioration of the battery can be suppressed. In addition, the residual capacity rate of the battery is improved.

The electrode of the present disclosure to be used as the positive electrode and/or a negative electrode of an alkali metal ion secondary battery may be produced by treating the surface of an electrode material coated with an active material, with a perfluoropolyether group-containing compound, or produced by applying an electrode mixture containing the perfluoropolyether group-containing compound in a step of forming a coating layer of the electrode mixture.

Since the electrode of the present disclosure contains a perfluoropolyether group-containing compound on the surface, as mentioned above, when the electrode is used as the positive electrode and/or negative electrode of an alkali metal ion secondary battery, preferably a lithium ion secondary battery, the alkali metal ion secondary battery can acquire satisfactory cycle characteristics, a large battery capacity, and satisfactory storage characteristics.

Separator

The separator is used for separating the positive electrode and the negative electrode to prevent a current short circuit caused by contact of both electrodes; at the same time, passing alkali metal ions, preferably lithium ions therethrough. The separator may be a porous film formed of, for example, a synthetic resin or ceramic, or a laminated film formed by laminating at least two types of porous films. As the synthetic resin, for example, polytetrafluoroethylene, polypropylene or polyethylene is mentioned.

Electrolytic Solution

The positive electrode, negative electrode and separator are impregnated with preferably, a liquid electrolyte, i.e., an electrolytic solution. The electrolytic solution is obtained by dissolving an electrolyte salt in a solvent, and optionally contains materials other than the electrolyte such as additives.

The solvent may be any one of nonaqueous solvents such as organic solvents or a mixture of at least two types of nonaqueous solvents.

As the solvent, for example, ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane or tetrahydrofuran is mentioned. Specific examples thereof include 2-methyl tetrahydrofuran, tetrahydropyran, 1,3-dioxolane, 4-methyl-1,3-dioxolane, 1,3-dioxane or 1,4-dioxane, methyl acetate, ethyl acetate, methyl propionate, ethyl propionate, methyl butyrate, methyl isobutyrate, methyl trimethylacetate or ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethylsulfoxide. when such a solvent is used, e.g., excellent battery capacity, cycle characteristics and storage characteristics can be obtained.

Of the solvents, at least one of ethylene carbonate, propylene carbonate, dimethyl carbonate, diethyl carbonate and ethyl methyl carbonate is preferably used. when such a solvent is used, more excellent characteristic can be obtained. In this case, a combination of a high-viscosity (high electric permittivity) solvent (for example, relative electric permittivity ε≥30) such as ethylene carbonate or propylene carbonate and a low-viscosity solvent (for example, viscosity ≤1 mPa·s) such as dimethyl carbonate, ethyl methyl carbonate or diethyl carbonate, is more preferably used. When these solvents are used in combination, dissociation of an electrolyte salt and ion mobility are improved.

In particular, a solvent as mentioned above preferably contains an unsaturated carbon bond cyclic carbonate. When a solvent contains an unsaturated carbon bond cyclic carbonate, a stable protective film is formed on the surface of a negative electrode during a charge/discharge time, suppressing the decomposition reaction of an electrolytic solution. The unsaturated carbon bond cyclic carbonate refers to a cyclic carbonate having one or two or more unsaturated carbon bonds, such as vinylene carbonate or vinylethylene carbonate. Note that, the content of the unsaturated carbon bond cyclic carbonate in a solvent, although it is not limited, is, for example, 0.01 wt % or more and 10 wt % or less. When the content of the unsaturated carbon bond cyclic carbonate in a solvent falls within the range mentioned above, the decomposition reaction of the electrolytic solution can be suppressed without excessively reducing a battery capacity.

A solvent as mentioned above preferably contains at least one of a halogenated chain carbonate and a halogenated cyclic carbonate. When such a solvent is contained, a stable protective film is formed on the surface of a negative electrode during a charge/discharge time, suppressing the decomposition reaction of an electrolytic solution. The halogenated chain carbonate refers to a chain carbonate having one or two or more halogen groups. The halogenated cyclic carbonate refers to a cyclic carbonate having one or two or more halogen groups. The type of the halogen group is not limited. Of the halogen groups, a fluorine group, a chlorine group or a bromine group is preferable and a fluorine group is more preferable. When a halogen group as mentioned above is used, a higher effect can be obtained. Note that, the number of halogen groups is preferably two rather than one, and may be three or more. When the number of halogen groups increases, a firmer and more stable protective film is obtained. Accordingly, the decomposition reaction of an electrolytic solution is more suppressed. The halogenated chain carbonate is, for example, fluoromethyl methyl carbonate, bis(fluoromethyl) carbonate or difluoromethy methyl carbonate. The halogenated cyclic carbonate is, for example, 4-fluoro-1,3-dioxolan-2-one or 4,5-difluoro-1,3-dioxolan-2-one. Note that, the contents of halogenated chain carbonate and halogenated cyclic carbonate in a solvent, although they are not limited, are, for example, 0.01 wt % or more and 50 wt % or less. When the contents fall within the range, the decomposition reaction of an electrolytic solution is more suppressed without excessively reducing a battery capacity.

A solvent as mentioned above may contain sultone (cyclic sulfonate). When a solvent contains sultone (cyclic sulfonate), chemical stability of an electrolytic solution can be more improved. Sultone is, for example, propane sultone or propene sultone. Note that, the content of a sultone in the solvent, although it is not limited, is, for example, 0.1 wt % or more and 5 wt % or less. When the content falls within the range, a reduction of a battery capacity can be suppressed and the decomposition reaction of an electrolytic solution can be suppressed.

A solvent as mentioned above may contain an acid anhydride. When a solvent contains an acid anhydride, chemical stability of an electrolytic solution is more improved. The acid anhydride is, for example, dicarboxylic anhydride, disulfonic acid anhydride or carboxylic acid sulfonic acid anhydride. The dicarboxylic anhydride is, for example, succinic anhydride, glutaric anhydride or maleic anhydride. The disulfonic acid anhydride is, for example, ethane disulfonic anhydride or propane disulfonic anhydride. The carboxylic acid sulfonic acid anhydride is, for example, anhydrous sulfobenzoic acid, anhydrous sulfopropionic acid or anhydrous sulfobutyric acid. Note that, the content of an acid anhydride in a solvent, although it is not limited, is, for example, 0.1 wt % or more and 5 wt % or less. When the content falls within the range, a reduction of a battery capacity can be suppressed and the decomposition reaction of an electrolytic solution can be suppressed.

Electrolyte Salt

The electrolyte salt may contain any one or two types or more of alkali metal salts as described below. Note that, the electrolyte salt may be a salt other than an alkali metal salt (for example, a light metal salt other than an alkali metal salt).

Examples of the alkali metal salt include compounds such as $MPFe$, $MBF_4$, $MClO_4$, $MAsF_6$, $MB(C_6H_5)_4$, $MCH_3SO_3$, $MCF_3SO_3$, $MAlCl_4$, $M_2SiF_6$, $MCl$ and $MBr$, wherein M is at least one metal selected from Li, Na and K, preferably a metal selected from Li, Na and K, more preferably Li or Na, further preferably Li.

When such an alkali metal salt is used, e.g., an excellent battery capacity, cycle characteristics and storage characteristics can be obtained. In particular, at least one selected from $MPFe$, $MBF_4$, $MClO_4$ and $MAsF_6$ is preferable and $MPFe$ is more preferable. When such an alkali metal salt is used, internal resistance further decreases and a higher effect can be obtained.

The content of an electrolyte salt as mentioned above relative to a solvent is preferably 0.1 mol/kg or more and 3.0 mol/kg or less. This is because if the content falls within the range, high ion conductivity can be obtained.

<Battery Design>

The structure of the electrodes may be either one of a laminated structure constructed by stacking a positive-electrode plate and a negative-electrode plate with a separator interposed between them and a roll structure constructed by winding a laminate obtained by stacking a positive-electrode plate and a negative-electrode plate with a separator interposed between them, like a coil. The volume ratio of the electrode groups occupied in the battery internal volume (hereinafter referred to as "an electrode group occupancy") is usually 40% or more, preferably 50% or more; and usually 90% or less and preferably 80% or less.

When the electrode group occupancy is below the range, battery capacity is low. In contrast, when the electrode group occupancy exceeds the range, the void space becomes low. In this case, when the temperature of the battery increases, members expand or the vapor pressure of liquid component of an electrolyte increases, increasing internal pressure. As a result, the charge and discharge repeatability of the battery and characteristics such as high temperature storage stability deteriorate and, in some cases, further a gas release valve for releasing internal pressure is actuated.

The structure of the current collector is not limited. To effectively improve charge and discharge characteristics at a high current density by the electrolytic solution, it is preferable to form a structure having wiring and joining parts reduced in resistance.

When the electrodes are the laminated structure, it is suitable to use a structure formed by bundling the metal core portions of individual electrode layers and fixing the in bundle to a terminal by welding. When a single electrode area is large, since the internal resistance increases, a plurality of terminals are provided within the electrode to reduce resistance. When the electrodes are wound like a coil, the internal resistance can be reduced by providing a plurality of lead-like structures in the positive electrodes and negative electrodes and bundling them and fixing the bundle to a terminal.

The material for an exterior case is not limited as long as it is a substance stable to the electrolytic solution to be used. More specifically, a metal such as a nickel plated steel sheet, stainless steel, aluminum or an aluminum alloy or a magnesium alloy or a laminated film (laminate film) of a resin and an aluminum foil, is used. To reduce weight, a metal such as aluminum or an aluminum alloy or a laminate film can be suitably used.

In the exterior case made of metals, metals are mutually welded by laser welding, resistance welding or ultrasonic welding to form a hermetically sealed structure or a structure formed of the metals by caulking via a resin gasket. In the exterior case made of a laminate film as mentioned above, resin layers are heat-sealed to obtain a hermetically sealed structure. To improve sealability, a resin different in type from the resin used in the laminate film may be interposed between the resin layers.

Particularly, when a sealed structure is formed by heat-sealing of resin layers via a current collector terminal, a metal and a resin are joined. For the reason, a resin having a polar group and a resin modified by introducing a polar group therein are suitably used as the resin to be interposed.

The shape of the alkali metal ion secondary battery of the present disclosure can be arbitrarily selected. For example, a cylindrical type, a square shape, a laminate and a coin (these may be large in size) are mentioned. Note that, the shapes and structure of the positive electrode, negative electrode and separator to be used may be changed depending on the shape of a battery.

<Electronic Device and Module>

An electrochemical device as mentioned above can be used in various electronic device or modules. Accordingly, the present disclosure also provides electrochemical devices of the present disclosure, particularly an electronic device or a module having a lithium ion secondary battery.

EXAMPLES

Now, the present disclosure will be described by way of Examples; however, the present disclosure is not limited to these Examples alone.

(Composition Containing Perfluoropolyether Group-Containing Compound)

As coating compositions for use in treating a positive electrode material and a negative electrode material, coating compositions 1 to 6 containing the following compounds A and B in the ratios shown in Table 1 and Table 2 were prepared.

Composition 1

  (A)

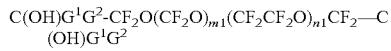  (B)

wherein m1=18, n1=20
$G^1$=—$C_3H_6$—Si(OCH$_3$)$_3$
$G^2$=—$C_3H_6$—Si(OCH$_3$)$_3$ Composition 2

  (A)

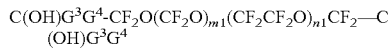  (B)

wherein m1=18, n1=20
$G^3$=—$C_3H_6$—Si(OCH$_3$)$_3$
$G^4$=—$C_3H_5$

Composition 3

  (A)

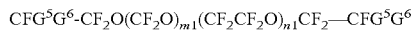  (B)

wherein m1=18, n1=20
$G^5$=—O—$C_3H_6$—Si(OCH$_3$)$_3$
$G^6$=—O—$C_3H_6$—Si(OCH$_3$)$_3$ Composition 4

  (A)

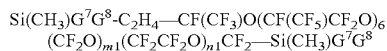  (B)

wherein m1=18, n1=20
$G^7$=—$C_2H_4$—Si(OCH$_3$)$_3$
$G^8$=—$C_2H_4$—Si(OCH$_3$)$_3$ Composition 5

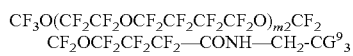  (A)

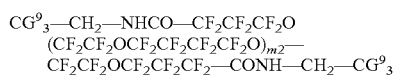  (B)

wherein m2=15
$G^9$=—$C_3H_6$—Si(OCH$_3$)$_3$

Composition 6

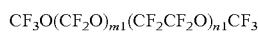  (6)

wherein m1=18, n1=20

Experimental Example 1

(Preparation of Electrolytic Solution)

Ethylene carbonate as a high-permittivity solvent and ethyl methyl carbonate and dimethyl carbonate as low-viscosity solvents were mixed so as to satisfy a volume ratio of 30:30:40. To the solvent mixture, LiPF6 was added so as to satisfy a concentration of 1.1 mole/liter to obtain a nonaqueous electrolytic solution.

(Production of Lithium Ion Secondary Battery)

Ninety mass % of Li(Ni$_{1/3}$Mn$_{1/3}$Co$_{1/3}$)O$_2$ as a positive electrode active material, 5 mass % of acetylene black as a conductive material, and 5 mass % of polyvinylidene fluoride (PVdF) as a binder were mixed in a N-methylpyrrolidone solvent to form a slurry. The obtained slurry was applied to one surface of aluminum foil having a thickness of 15 μm that had been coated with a conductive additive in advance, dried, and roll-pressed with a press, and the resulting product was cut into a positive electrode having a shape having a width of 50 mm and a length of 30 mm in terms of the size of an active material layer and an uncoated portion having a width of 5 mm and a length of 9 mm.

To 98 parts by mass of a carbonaceous material (graphite) were added 1 part by mass of an aqueous dispersion of sodium carboxymethylcellulose (sodium carboxymethylcellulose concentration of 1% by mass) as a thickener and a binder and 1 part by mass of an aqueous dispersion of styrene-butadiene rubber (styrene-butadiene rubber concentration of 50% by mass) and mixed with a disperser to form a slurry. The obtained slurry was applied to aluminum foil having a thickness of 10 μm, dried, and roll-pressed with a press, and the resulting product was cut into a negative electrode having a shape having a width of 52 mm and a length of 32 mm in terms of the size of an active material layer and an uncoated portion having a width of 5 mm and a length of 9 mm.

The positive electrode material and negative electrode material obtained above were subjected to a coating treatment with each of the compounds shown in Table 1 below and the treatment was performed in the following manner.

Coating Treatment (Dip Method)

The following coating compositions (compositions 1 to 6) were each diluted with hydrofluoroether (HFE7200, manufactured by SUMITOMO 3M) so as to satisfy a solid content of 0.1%. After an electrode material was dipped in the diluted solution for one minute, excessive compound present on the surface of the electrode material was washed away with HFE7200. Thereafter, the electrode material was dried to obtain an electrode having the surface treated with the fluorine compound.

[Production of Aluminum Laminate Cell]

The positive electrode was disposed so as to face the negative electrode with a microporous polyethylene film (separator) having a thickness 20 μm interposed between them, and then, the nonaqueous electrolytic solution obtained above was poured. After the electrodes and separator were sufficiently impregnated with the nonaqueous electrolytic solution, they were sealed, preliminarily charged and aged to produce a lithium ion secondary battery.

(Determination of Battery Characteristics)

The obtained aluminum laminate cell was subjected to a high-temperature storage test to determine the amount of eluted transition metal as described below.

(Determination of Battery Characteristics)

[Evaluation of Initial Characteristics]

At 25° C., a battery was charged to 4.35 V at a constant current corresponding to 0.2 C, and then discharged to 3.0 V with a constant current of 0.2 C. This was performed 2 cycles to stabilize the battery, and in the third cycle, the battery was charged to 4.35V at a constant current of 0.2 C, then charged at a constant voltage of 4.35 V until the current value was 0.05 C, and discharged to 3.0 V at a constant current of 0.2 C to determine the initial discharge capacity. Then, the battery was charged to 4.35 V at a constant current of 0.2 C, then charged at a constant voltage of 4.35 V until the current value was 0.05 C, and subjected to a storage test.

The unit 1 C herein represents a current value when the reference capacity of a battery is discharged in one hour, thus 5 C represents a 5 times greater current value, 0.1 C represents ¹⁄₁₀ of the current value, and 0.2 C represents ⅕ of the current value.

A charged secondary battery after completion of the initial characteristics evaluation was stored at a high temperature under 60° C. and 672-hour conditions. The battery after being sufficiently cooled was discharged to 3 V at 0.5 C at 25° C., then charged to 4.35 V at a constant current of 0.2 C, then charged at a constant voltage of 4.35 V until the current value was 0.05 C, and discharged to 3.0 V at a constant current of 0.2 C to determine the storage capacity.

A capacity retention rate (%) was determined based on the following expression.

(Storage capacity)/(Initial discharge capacity)×100=Capacity retention rate (%)

The results are shown in Table 1.
(Amount of Eluted Transition Metal)

The cell after the storage capacity measurement was disassembled, and the negative electrode was washed with dimethyl carbonate (DMC) to remove transition metal precipitated on the negative electrode. The amount of eluted transition metal was determined by quantifying Ni and Mn of the transition metal-containing DMC solution by ICP emission analysis. The amount of eluted transition metal on an electrode not subjected to a coating treatment was regarded as 100% for comparison. The amount of eluted transition metal on the positive electrode was assumed to be the amount of transition metal precipitated on the negative electrode.

The results are shown in Table 1.

into a positive electrode having a shape having a width of 50 mm and a length of 30 mm in terms of the size of an active material layer and an uncoated portion having a width of 5 mm and a length of 9 mm.

To 98 parts by mass of artificial graphite were added 1 part by mass of an aqueous dispersion of sodium carboxymethylcellulose (sodium carboxymethylcellulose concentration of 1 mass %) as a thickener and a binder and 1 part by mass of an aqueous dispersion of styrene-butadiene rubber (styrene-butadiene rubber concentration of 50 mass %) and mixed with a disperser to form a slurry. The obtained slurry was applied to aluminum foil having a thickness of 10 μm, dried, and roll-pressed with a press, and the resulting product was cut into a negative electrode having a shape having a width of 52 mm and a length of 32 mm in terms of the size of an active material layer and an uncoated portion having a width of 5 mm and a length of 9 mm.

The positive electrode material and negative electrode material obtained above were treated as follows with each of the compounds shown in Table 2 below.

Treatment with Coating Agent (Physical Vapor Deposition (PVD) Method)

The following coating compositions (compositions 1 to 6) were each weighed and put in a copper container, which was set in a resistance heating vessel in the vacuum chamber; and

TABLE 1

|  | Composition | Component ratio (mol %) | | Coated electrode | Capacity retention rate (%) | Amount of precipitated metal (%) | |
|---|---|---|---|---|---|---|---|
|  |  | (A) | (B) |  |  | Mn | Ni |
| Example 1 | 1 | 99.8 | 0.2 | Positive Electrode | 86 | 46 | 55 |
| Example 2 | 1 | 99 | 1 | Positive Electrode | 88 | 45 | 52 |
| Example 3 | 1 | 95 | 5 | Positive Electrode | 89 | 41 | 50 |
| Example 4 | 1 | 90 | 10 | Positive Electrode | 92 | 41 | 48 |
| Example 5 | 1 | 85 | 15 | Positive Electrode | 90 | 48 | 46 |
| Example 6 | 1 | 80 | 20 | Positive Electrode | 85 | 50 | 51 |
| Example 7 | 1 | 75 | 25 | Positive Electrode | 84 | 55 | 55 |
| Example 8 | 1 | 70 | 30 | Positive Electrode | 80 | 57 | 58 |
| Example 9 | 2 | 80 | 20 | Positive Electrode | 77 | 51 | 55 |
| Example 10 | 3 | 85 | 15 | Positive Electrode | 93 | 51 | 50 |
| Example 11 | 4 | 80 | 20 | Positive Electrode | 81 | 47 | 49 |
| Example 12 | 5 | 80 | 20 | Positive Electrode | 88 | 53 | 52 |
| Comparative Example 1 | 1 | 60 | 40 | Positive Electrode | 60 | 93 | 97 |
| Comparative Example 2 | 6 | — | — | Positive Electrode | 57 | 96 | 101 |
| Comparative Example 3 | — | — | — |  | 54 | 100 | 100 |

Experimental Example 2

(Preparation of Electrolytic Solution)

Ethylene carbonate and monofluoroethylene carbonate as high-permittivity solvents and ethyl methyl carbonate as a low-viscosity solvent were mixed so as to satisfy a volume ratio of 30:5:65. To the solvent mixture, $LiPF_6$ was added so as to satisfy a concentration of 1.0 mole/liter to obtain a nonaqueous electrolytic solution.

(Production of Lithium Ion Secondary Battery)

Ninety mass % of $LiMn_2O_4$ as a positive electrode active material, 5 mass % of acetylene black as a conductive material, and 5 mass % of polyvinylidene fluoride (PVdF) as a binder were mixed in a N-methylpyrrolidone solvent to form a slurry. The obtained slurry was applied to one surface of aluminum foil having a thickness of 15 μm that had been coated with a conductive additive in advance, dried, and roll-pressed with a press, and the resulting product was cut an electrode material was set in an upper portion of the chamber. Thereafter, the internal pressure of the chamber was controlled to be 10-3 Pa by a vacuum pump. The resistance heating of the compound in the copper container was carried out to deposit the compound onto the electrode material. In this manner, an electrode whose surface was treated with the compound was obtained. The compound corresponds to the 9-10 nm film thickness as measured by a crystal oscillator provided inside the vapor deposition chamber by setting the compound so as to be a treatment amount of 50 mg per 1 m² in terms of solid content (0.01 mg per electrode).

[Production of Aluminum Laminate Cell]

The positive electrode was disposed so as to face the negative electrode with a microporous polyethylene film (separator) having a thickness of 20 μm interposed between them, and then, the nonaqueous electrolytic solution obtained above was poured. After the electrodes and separator were sufficiently impregnated with the electrolytic solution, they were sealed, preliminarily charged and aged to produce a lithium ion secondary battery.
(Determination of Battery Characteristics)

The cycle capacity retention rates and resistance increase rates of the obtained aluminum laminate cells at low temperature were investigated as follows.
(Determination of Battery Characteristics)
Low-Temperature Cycle Capacity Retention Rate At 25° C., a battery was charged to 4.2 V at a constant current corresponding to 0.2 C, and then discharged to 3.0 V at a constant current of 0.2 C. This was performed 2 cycles to stabilize the battery. The secondary battery produced above was then, in a −10° C. environment, charged to 4.2V at a constant current of 0.2 C, then charged at a constant voltage of 4.2 V until the current value was 0.05 C, and discharged to 3.0V at a constant current of 0.2 C to determine the initial discharge capacity. Charge and discharge were carried out in the same manner as above. After 200 cycles, the discharge capacity was measured. The ratio of the discharge capacity after 200 cycles relative to the initial discharge capacity was obtained based on the following expression and specified as a cycle capacity retention rate (%). The measurement temperature of the cycle test was set to be −10° C. The results are shown in Table 2.

(Discharge capacity after 200 cycles)/(Initial discharge capacity)×100=Cycle capacity retention rate (%)

(Measurement of Resistance Increase Rate)

The resistance of the battery, that had been stabilized as described above, at the time of calculating the initial discharge capacity and the resistance after the cycle test were measured. The measurement temperature was set to be −20° C. A resistance increase rate after the storage test was obtained based on the following expression. The results are shown in Table 2.

Resistance increase rate (%)=Resistance (Ω) after 200 cycles/Resistance (Ω) after initial discharge capacity calculation×100

INDUSTRIAL APPLICABILITY

The alkali metal battery of the present disclosure, since it is excellent in cycle characteristics, can be usefully used various electronic devices, particularly electronic devices having a high frequency of use, such as smart phones, mobile phones, tablet terminals and laptop computers.

The invention claimed is:
1. An alkali metal ion secondary battery which has a positive electrode, a negative electrode, a separator and an electrolytic solution in an exterior case, wherein one or both of the positive electrode and the negative electrode have a coating layer formed from a composition comprising a perfluoropolyether group-containing compound which is a combination of a compound (A1) and a compound (A2), a combination of a compound (B1) and a compound (B2), a combination of a compound (C1) and a compound (C2), a combination of a compound (D1) and a compound (D2), or a combination of a compound (E1) and a compound (E2):

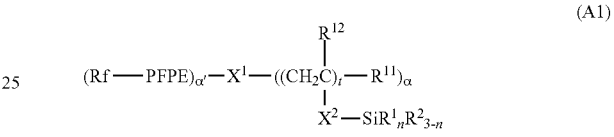

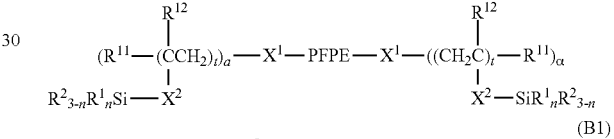

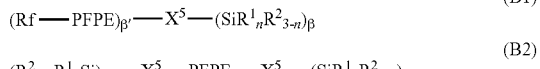

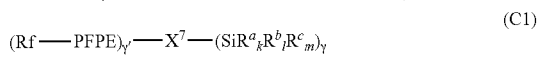

TABLE 2

| | | Component ratio (mol %) | | | Cycle capacity retention rate | Resistance increase rate |
| --- | --- | --- | --- | --- | --- | --- |
| | Composition | (A) | (B) | Coated electrode | (%) | (%) |
| Example 13 | 1 | 99.8 | 0.2 | Negative Electrode | 83 | 160 |
| Example 14 | 1 | 99 | 1 | Negative Electrode | 84 | 159 |
| Example 15 | 1 | 95 | 5 | Negative Electrode | 86 | 157 |
| Example 16 | 1 | 90 | 10 | Negative Electrode | 85 | 155 |
| Example 17 | 1 | 85 | 15 | Negative Electrode | 81 | 154 |
| Example 18 | 1 | 80 | 20 | Negative Electrode | 80 | 151 |
| Example 19 | 1 | 75 | 25 | Negative Electrode | 78 | 148 |
| Example 20 | 1 | 70 | 30 | Negative Electrode | 77 | 146 |
| Example 21 | 2 | 90 | 20 | Positive Electrode Negative Electrode | 82 | 141 |
| Example 22 | 2 | 80 | 20 | Negative Electrode | 79 | 166 |
| Example 23 | 3 | 85 | 15 | Negative Electrode | 82 | 160 |
| Example 24 | 4 | 80 | 20 | Negative Electrode | 77 | 153 |
| Example 25 | 5 | 80 | 20 | Negative Electrode | 85 | 153 |
| Example 26 | 6 | 90 | 10 | Negative Electrode | 84 | 153 |
| Comparative Example 4 | 1 | 60 | 40 | Negative Electrode | 60 | 210 |
| Comparative Example 5 | 6 | — | — | Negative Electrode | 57 | 220 |
| Comparative Example 6 | — | — | — | | 54 | 228 |

-continued $$(R^c_m R^b_l R^a_k Si)_\gamma \text{—} X^7 \text{—PFPE—} X^7 \text{—}(SiR^a_k R^b_l R^c_m)_\gamma \quad (C2)$$

$$(Rf\text{—PFPE})_{\delta'} \text{—} X^9 \text{—}(CR^d_k R^e_l R^f_{m'})_\delta \quad (D1)$$

$$(R^f_{m'} R^e_l R^d_k C)_\delta \text{—} X^9 \text{—PFPE—} X^9 \text{—}(CR^d_k R^e_l R^f_{m'})_\delta \quad (D2)$$

$$(Rf\text{—PFPE})_{\varepsilon'} \text{—} X^3 \text{—}(A)_\varepsilon \quad (E1)$$

$$(A)_\varepsilon \text{—} X^3 \text{—PFPE—} X^3 \text{—}(A)_\varepsilon \quad (E2)$$

wherein:

Rf each independently represents an alkyl group having 1 to 16 carbon atoms optionally substituted with one or more fluorine atoms;

PFPE each independently represents —$(OC_6F_{12})_a$—$(OC_5F_{10})_b$—$(OC_4F_8)_c$—$(OC_3F_6)_d$—$(OC_2F_4)_e$—$(OCF_2)_f$—, wherein a, b, c, d, e and f are each independently an integer of 0 or more and 200 or less, and the sum of a, b, c, d, e and f is at least 1, the occurrence order of the respective repeating units in parentheses with subscript a, b, c, d, e or f is not limited in the formula;

$R^1$ each independently at each occurrence represents a hydrogen atom or an alkyl group having 1 to 22 carbon atoms;

$R^2$ each independently at each occurrence represents a hydroxyl group or a hydrolyzable group;

$R^{11}$ each independently at each occurrence represents a hydrogen atom or a halogen atom;

$R^{12}$ each independently at each occurrence represents a hydrogen atom or a lower alkyl group;

n is an integer of 0 to 3 independently for each $(-SiR^1_n R^2_{3-n})$ unit;

provided that, in formulae (A1), (A2), (B1) and (B2), at least one $R^2$ is present;

$X^1$ each independently represents a single bond or a di- to pentavalent organic group;

$X^2$ each independently at each occurrence represents a single bond or a divalent organic group;

t each independently at each occurrence represents an integer of 1 to 10;

α is each independently an integer of 1 to 9;

α is an integer of 1 to 9;

$X^5$ each independently represents a di- to pentavalent organic group;

β is each independently an integer of 1 to 9;

β' is an integer of 1 to 9;

$X^7$ each independently represents a single bond or a di- to pentavalent organic group;

γ is each independently an integer of 1 to 9;

γ' is an integer of 1 to 9;

$R^a$ each independently at each occurrence represents —$Z$—$SiR^{71}_p R^{72}_q R^{73}_r$;

Z each independently at each occurrence represents an oxygen atom or a divalent organic group;

$R^{71}$ each independently at each occurrence represents $R^{a'}$;

$R^{a'}$ has the same definition as $R^a$;

in $R^a$, the number of Si linearly connected via Z group is at most 5;

$R^{72}$ each independently at each occurrence represents a hydroxyl group or a hydrolyzable group;

$R^{73}$ each independently at each occurrence represents a hydrogen atom or a lower alkyl group;

p is each independently at each occurrence an integer of 0 to 3;

q is each independently at each occurrence an integer of 0 to 3;

r is each independently at each occurrence an integer of 0 to 3;

provided that, the sum of p, q and r is 3 for each —$Z$—$SiR^{71}_p R^{72}_q R^{73}_r$, and at least one $R^{72}$ is present in formulae (C1) and (C2);

$R^b$ each independently at each occurrence represents a hydroxyl group or a hydrolyzable group;

$R^C$ each independently at each occurrence represents a hydrogen atom or a lower alkyl group;

k is each independently at each occurrence an integer of 1 to 3;

l is each independently at each occurrence an integer of 0 to 2;

m is each independently at each occurrence an integer of 0 to 2;

provided that, in the unit in parentheses with the subscript γ, the sum of k, l and m is 3;

$X^9$ each independently represents a single bond or a di- to pentavalent organic group;

δ is each independently an integer of 1 to 9;

δ' is an integer of 1 to 9;

$R^d$ each independently at each occurrence represents —$Z'$—$CR^{81}_p R^{82}_q R^{83}_r$;

Z' each independently at each occurrence represents an oxygen atom or a divalent organic group;

$R^{81}$ each independently at each occurrence represents $R^{d'}$;

$R^{d'}$ has the same meaning as $R^d$;

in $R^d$, the number of C linearly connected via Z' group is at most 5;

$R^{82}$ each independently at each occurrence represents —$Y$—$SiR^{85}_j R^{86}_{3-j}$;

Y each independently at each occurrence represents a divalent organic group;

$R^{85}$ each independently at each occurrence represents a hydroxyl group or a hydrolyzable group;

$R^{86}$ each independently at each occurrence represents a hydrogen atom or a lower alkyl group;

j represents an integer of 1 to 3 independently for each $(-Y-SiR^{85}_j R^{86}_{3-j})$ unit;

$R^{83}$ each independently at each occurrence represents a hydrogen atom or a lower alkyl group;

p' is each independently at each occurrence an integer of 0 to 3;

q' is each independently at each occurrence an integer of 0 to 3;

r' is each independently at each occurrence an integer of 0 to 3;

$R^e$ each independently at each occurrence represents —$Y$—$SiR^{85}_j R^{86}_{3-j}$;

$R^f$ each independently at each occurrence represents a hydrogen atom or a lower alkyl group;

k' is each independently at each occurrence an integer of 0 to 3;

l' is each independently at each occurrence an integer of 0 to 3;

m' is each independently at each occurrence an integer of 0 to 3;

provided that, in the formula, at least one q' is 2 or 3 or at least one l' is 2 or 3;

$X^3$ each independently represents a single bond or a di- to pentavalent organic group;

ε is each independently an integer of 1 to 9;

ε' is an integer of 1 to 9;

A each independently at each occurrence represents
—OH, —SH, —NR$_2$, —COOR or —SO$_3$R; and
R represents a hydrogen atom or an alkyl group.

2. The alkali metal ion secondary battery according to claim 1, wherein only the positive electrode has a coating layer formed from the composition comprising a perfluoropolyether group-containing compound.

3. The alkali metal ion secondary battery according to claim 1, wherein only the negative electrode has a coating layer formed from the composition comprising a perfluoropolyether group-containing compound.

4. The alkali metal ion secondary battery according to claim 1, wherein both the positive electrode and the negative electrode have a coating layer formed from the composition comprising a perfluoropolyether group-containing compound.

5. The alkali metal ion secondary battery according to claim 1, wherein the composition further comprises one or more fluorine-containing oils represented by formula (3):

$$R^{21}-(OC_4F_8)_{a'}-(OC_3F_6)_{b'}-(OC_2F_4)_{c'}-(OCF_2)_{d'}-R^{22} \quad (3)$$

wherein:
R$^{21}$ represents an alkyl group having 1 to 16 carbon atoms optionally substituted with one or more fluorine atoms;
R$^{22}$ represents an alkyl group having 1 to 16 carbon atoms optionally substituted with one or more fluorine atoms, a fluorine atom, or a hydrogen atom; and
a', b', c' and d' represent the respective numbers of four repeating units in perfluoro(poly)ether constituting a main backbone of the polymer and are each independently an integer of 0 or more and 300 or less, the sum of a', b', c' and d' is at least 1, and the occurrence order of the respective repeating units in parentheses with subscript a', b', c' or d' is not limited in the formula.

6. The alkali metal ion secondary battery according to claim 5, wherein, in the composition, the compound represented by formula (3) is 0.1 mol % or more and 50 mol % or less based on a total amount of the compounds (A1) to (E1), (A2) to (E2) and the compound represented by formula (3).

7. The alkali metal ion secondary battery according to claim 1, wherein α, α', β, β' γ, γ', δ, δ', ε and ε' are 1.

8. The alkali metal ion secondary battery according to claim 1, wherein A is —OH or —COOR.

9. The alkali metal ion secondary battery according to claim 1, wherein the perfluoropolyether group-containing compound is selected from perfluoropolyether compounds represented by formulae the combination of the compound (A1) and the compound (A2), the combination of the compound (B1) and the compound (B2), the combination of the compound (C1) and the compound (C2), or the combination of the compound (D1) and the compound (D2).

10. The alkali metal ion secondary battery according to claim 1, wherein the perfluoropolyether group-containing compound is selected from perfluoropolyether compounds represented by the combination of the compound (A1) and the compound (A2), the combination of the compound (C1) and the compound (C2), or the combination of the compound (D1) and the compound (D2).

11. The alkali metal ion secondary battery according to claim 9, wherein the perfluoropolyether group-containing compound has two or more Si atoms having a hydroxyl group or a hydrolyzable group at one end or both ends.

12. The alkali metal ion secondary battery according to claim 9, wherein the perfluoropolyether group-containing compound has two or more Si atoms having a hydrolyzable group at one end or both ends.

13. The alkali metal ion secondary battery according to claim 1, wherein PFPE at each occurrence is independently a group represented by the following formula (a), (b) or (c):

$$-(OC_3F_6)_d- \quad (a)$$

wherein OC$_3$F$_6$ is linear; and
d is an integer of 1 to 200;

$$-(OC_4F_8)_c-(OC_3F_6)_d-(OC_2F_4)_e-(OCF_2)_f- \quad (b)$$

wherein OC$_2$F$_4$, OC$_3$F$_6$ and OC$_4$F$_8$ are linear;
c and d are each independently an integer of 0 or more and 30 or less;
e and f each independently represent an integer of 1 or more and 200 or less;
the sum of c, d, e and f is an integer of 10 or more and 200 or less; and
the occurrence order of the respective repeating units in parentheses with subscript c, d, e or f is not limited in the formula;

$$-(R^6-R^7)_q- \quad (c)$$

wherein R$^6$ represents OCF$_2$ or OC$_2$F$_4$;
R$^7$ represents a group selected from OC$_2$F$_4$, OC$_3$F$_6$, OC$_4$F$_8$, OC$_5$F$_{10}$ and OC$_6$F$_{12}$ or a combination of 2 or 3 groups selected from these groups;
OC$_2$F$_4$, OC$_3$F$_6$ and OC$_4$F$_8$ are linear; and
q is an integer of 2 to 100.

14. The alkali metal ion secondary battery according to claim 1, wherein X$^1$, X$^3$, X$^5$, X$^7$ and X$^9$ are each independently a divalent group represented by the following formula:

$$-(R^{31})_{p1}-(X^a)_{q1}-$$

wherein:
R$^{31}$ represents a single bond, —(CH$_2$)$_{s'}$, or o-, m- or p-phenylene group;
s' is an integer of 1 to 20;
X$^a$ represents —(X$^b$)$_{l'}$—;
X$^b$ each independently at each occurrence represents a group selected from the group consisting of —O—, —S—, an o-, m- or p-phenylene group, —C(O)O—, —Si(R$^{33}$)$_2$—, —(Si(R$^{33}$)$_2$O)$_{m''}$—Si(R$^{33}$)$_2$—, —CONR$^{34}$—, —O—CONR$^{34}$—, —NR$^{34}$— and —(CH$_2$)$_{n'}$—;
R$^{33}$ each independently at each occurrence represents a phenyl group, a C$_{1-6}$ alkyl group or a C$_{1-6}$ alkoxy group;
R$^{34}$ each independently at each occurrence represents a hydrogen atom, a phenyl group or a C$_{1-6}$ alkyl group;
m'' is each independently at each occurrence an integer of 1 to 100;
n' is each independently at each occurrence an integer of 1 to 20;
l' is an integer of 1 to 10;
p1 is 0 or 1; and
q1 is 0 or 1;
provided that at least one of p1 and q1 is 1, and the occurrence order of the respective repeating units in parentheses with the subscript p1 or q1 is not limited.

15. The alkali metal ion secondary battery according to claim 1, wherein $X^1$, $X^3$, $X^5$, $X^7$ and $X^9$ are each independently:
- a single bond,
- a $C_{1-20}$ alkylene group,
- $(CH_2)_{s'}-X^c-$, or
- $(CH_2)_{s'}-X^c-(CH_2)_{t'}-$ wherein:
$X^c$ represents $-O-$, $-CONR^{34}-$ or $-O-CONR^{34}-$;
$R^{34}$ each independently at each occurrence represents a hydrogen atom, a phenyl group or a $C_{1-6}$ alkyl group;
s' is an integer of 1 to 20; and
t' is an integer of 1 to 20.

16. The alkali metal ion secondary battery according to claim 1, wherein the perfluoropolyether group-containing compound is the combination of the compound (A1) and the compound (A2).

17. The alkali metal ion secondary battery according to claim 1, wherein the perfluoropolyether group-containing compound is the combination of the compound (B1) and the compound (B2).

18. The alkali metal ion secondary battery according to claim 1, wherein the perfluoropolyether group-containing compound is the combination of the compound (C1) and the compound (C2).

19. The alkali metal ion secondary battery according to claim 1, wherein the perfluoropolyether group-containing compound is the combination of the compound (D1) and the compound (D2).

20. The alkali metal ion secondary battery according to claim 1, wherein the perfluoropolyether group-containing compound is the combination of the compound (E1) and the compound (E2).

21. The alkali metal ion secondary battery according to claim 1, wherein the perfluoropolyether group-containing compound has a number average molecular weight of 1,000 to 30,000.

* * * * *